(12) United States Patent
Chidambaran et al.

(10) Patent No.: US 9,095,822 B2
(45) Date of Patent: Aug. 4, 2015

(54) SPLIT FLOW EDI APPARATUS FOR TREATING SECOND PASS RO PERMEATE WATER WITH HIGH FLOW RATE

(75) Inventors: Ravi Chidambaran, Canonsburg, PA (US); Narendra Singh Bisht, Maharastra (IN); Pavan Raina, Maharastra (IN)

(73) Assignee: AQUATECH INTERNATIONAL CORPORATION, Canonsburg, PA (US)

( * ) Notice: Subject to any disclaimer, the term of this patent is extended or adjusted under 35 U.S.C. 154(b) by 524 days.

(21) Appl. No.: 13/251,677

(22) Filed: Oct. 3, 2011

(65) Prior Publication Data

US 2012/0080314 A1   Apr. 5, 2012

Related U.S. Application Data

(60) Provisional application No. 61/428,413, filed on Dec. 30, 2010.

(30) Foreign Application Priority Data

Oct. 4, 2010   (IN) .......................... 2384/DEL/2010

(51) Int. Cl.
*B01D 61/48* (2006.01)
*C02F 1/469* (2006.01)
(Continued)

(52) U.S. Cl.
CPC .............. *B01D 61/58* (2013.01); *B01D 61/485* (2013.01); *C02F 1/4695* (2013.01);
(Continued)

(58) Field of Classification Search
CPC ...... B01D 61/48; B01D 61/485; B01D 61/58; C02F 1/4695

USPC .......... 204/533, 536, 632, 634; 205/746, 748
See application file for complete search history.

(56) References Cited

U.S. PATENT DOCUMENTS 7,138,045 B2 *  11/2006  Sferrazza ...................... 205/523
7,763,157 B2 *   7/2010  Bejtlich et al. ................ 204/632
(Continued)

FOREIGN PATENT DOCUMENTS

CN       2124756 U     12/1992
CN       2402668 Y     10/2000

OTHER PUBLICATIONS

International Search Report for PCT/US11/54585 dated Feb. 21, 2012 (Form PCT/ISA/210).
Written Opinion of the International Searching Authority dated Feb. 21, 2012 (Form PCT/ISA/237).
(Continued)

*Primary Examiner* — Keith Hendricks
*Assistant Examiner* — Salil Jain
(74) *Attorney, Agent, or Firm* — Buchanan Ingersoll & Rooney PC

(57) ABSTRACT

We report an electro-deionization (EDI) device having split flow arrangement for the purification of second pass RO permeate water with high flow rate in which the feed water is fed through the center port and is diverted into each section of dilute chamber with equal flow rate, producing two product streams. The EDI device has concentrate chambers adjacent to dilute chambers in two sections of the stack, allowing independent flow through the separate sections. The split flow design reduces resin bed depth requirement for processing of second pass RO permeate water. This results in higher flow rate through the stack, elimination of the pressure drop limitation, and reduction of power consumption per unit volume of water.

7 Claims, 11 Drawing Sheets

(51) Int. Cl.
  *B01D 61/58* (2006.01)
  *B01D 61/02* (2006.01)
  *C02F 1/44* (2006.01)
  *C02F 9/00* (2006.01)

(52) U.S. Cl.
  CPC .............. *B01D 61/025* (2013.01); *B01D 61/48* (2013.01); *C02F 1/441* (2013.01); *C02F 9/00* (2013.01); *C02F 2201/4611* (2013.01); *C02F 2201/4618* (2013.01); *C02F 2209/05* (2013.01)

(56) References Cited

U.S. PATENT DOCUMENTS

2004/0206627 A1   10/2004   Bejtlich, III et al.
2007/0056847 A1*  3/2007    Akahori et al. ............... 204/252

OTHER PUBLICATIONS

Chinese Office Action for Application No. 201180054658.5 dated Oct. 28, 2014.

* cited by examiner

C-1 = Concentrate -1 IN   R-1 = Reject-1
C-2 = Concentrate -2 IN   R-2 = Reject-2

Stack product flow = Product-1 flow + Product-2 flow

All dimension in mm

SPLIT FLOW EDI APPARATUS FOR TREATING SECOND PASS RO PERMEATE WATER WITH HIGH FLOW RATE

CROSS-REFERENCE TO RELATED APPLICATIONS

This application claims priority to U.S. Provisional Patent Application No. 61/428,413, filed on Dec. 30, 2010, and to Indian Patent Application No. 2384/DEL/2010, filed on Oct. 4, 2010. Both of those applications are incorporated by reference as if fully rewritten herein.

BACKGROUND OF THE INVENTION

1. Field of the Invention

Embodiments of the invention relate to electro-deionization methods and apparatus.

2. Background of the Related Art

An Electro-Deionization apparatus (EDI) is a device that removes the dissolved impurities of reverse osmosis ("RO") permeate water with the help of resin media, ion exchange membrane and DC current. The EDI process is a continuous process as it does not need chemicals such as acid and caustic for regeneration of resin media and membranes. The resin media is regenerated during the purification of water due to continuous water splitting occurring inside the EDI apparatus. Splitting of H+ and OH− ions happens due to the electric potential generated within the dilute compartment from the H2O molecules which regenerates the corresponding resin ions continuously.

An EDI apparatus is generally used for the purification of reverse osmosis permeate water up to a level of 0.055 μS/cm conductivity and makes it suitable for various industrial applications including but not limited to boiler feed/steam generation, microelectronics/semiconductor makeup or rinse water, and purified USP grade water.

An EDI apparatus is typically made up of ion exchange resin, ion exchange membranes, electrodes for DC supply and hardware components for water flow distribution. The arrangement of ion exchange membranes, anion exchange membranes and cation exchange membrane, are very important in an EDI apparatus. They are generally arranged in alternate manner with respect to anode and cathode electrodes. The ion exchange resin media are filled in the chambers/compartments which are formed due the arrangement of anion and cation exchange membranes. This leads to the formation of dilute chambers and concentrate chambers.

The dilute chambers are those in which the feed water (RO permeate) gets purified and become ultra pure water whereas the concentrate chambers are adjacent alternate positioned to dilute in which the removed ions from the dilute chambers are collected and flushed out from the apparatus with the help of separate water stream. A small portion of the water is also used for flushing and cooling the cathode and anode electrodes, called Electrode Rinse stream and the chamber is called the Electrode Rinse Chamber.

The efficiency and commercial utilization of any EDI apparatus depends upon the quantity of product water produced per unit area of membrane, per unit volume of ion exchange media or per cell pair of membranes. There are many commercial EDI apparatus are available in market which can be easily divided into three categories—

1) Low Flow Rate EDI Apparatus:

This type of EDI apparatus are generally thin cell plate and frame EDI having product flow rate range of 1.5 m3/hr and 2.0 m3/hr with 30 or more cell pair. The output product flow of each dilute chamber is generally in the range of 50 to 60 LPH or less.

2) Medium Flow Rate EDI Apparatus:

The second category EDI apparatus are generally thick cell plate and frame EDI having product flow rate of 2.5 m3/hr-5.0 m3/hr with 30 cell pair or more. The output product flow of each dilute chamber is generally in the range of 80 to 170 LPH or less.

In both the first and the second category the pressure drop across dilute chamber (feed to product) is typically around 20 to 30 psi for nominal flow rate. For maximum flow rate it typically increases up to 40-60 psi. The effective length of dilute chambers of such EDI apparatus vary from 350 mm to 450 mm and width vary from 100 mm to 200 mm. The resin volume inside the dilute chambers of these EDI apparatus does not allow increase in the flow rate due to high pressure drops, mechanical leaks or mechanical strength of the apparatus.

The typical flow configuration of both category EDI apparatus is shown in FIG. 1. A third category of EDI apparatus is also used.

3) High Flow EDI Apparatus:

To achieve high product flow rate, more than 5.0 m3/hr, a third category of EDI apparatus is also used, which is generally the combination of multiple EDI apparatus, connected together in parallel with 40 to 60 number of cell pairs per unit, for producing high product flow rate from the stacks. The product flow rate per dilute chamber of this type EDI apparatus is similar to medium flow rate EDI apparatus. The high product flow through these EDI apparatus is only due to the increased area of dilute chambers.

For the production of ultra pure water, an EDI apparatus generally is used to purify either permeate water of single pass RO, where the feed ion load is high with challenging scaling ions, or permeate water of second pass RO permeate, where the feed ions load are very less with negligible amount of scaling ions.

The scaling ions (like $Ca^{2+}$, $Mg^{2+}$, $CO_3$, $SiO_2$, etc) have big role to play in any EDI operation and have been the cause for limiting conditions requiring additional pretreatment that may be uneconomical in many cases. Some solutions to this problem have been proposed. For example, the fractional deionization process reported in U.S. Pat. No. 6,896,814, incorporated by reference herein, uses a dual voltage process for the removal of higher load of scaling ions without scaling in EDI apparatus.

EDI design for certain flow depends upon the feed condition and the product quality requirement. For harsher feed condition such as single pass RO permeate water with challenging scaling ions, the product flow is typically reduced. This makes the system costly and therefore unattractive for use.

The typical product flow rate of an EDI apparatus at different feed hardness (as $CaCO_3$) and feed conductivity equivalent (FCE) loads are summarized as, a. Product flow rate=2.4 m3/hr when feed hardness (as $CaCO_3$) is 3 ppm and total FCE load is 25-30 μS/cm for the product quality requirement of more than 10 to 16 MOhms b. Product flow rate=3.5 m3/hr when feed hardness (as $CaCO_3$) is 1 ppm and total FCE load is 15-20 μS/cm for the product quality requirement of more than 10 to 16 MOhms c. Product flow rate=4.5 m3/hr when feed hardness (as $CaCO_3$) is 0.1 ppm and total FCE load is <10 μS/cm for the product quality requirement of more than 10 to 16 MOhms When the feed hardness (as $CaCO_3$) is less than 0.1 ppm like in second pass RO permeate water, the EDI behavior is quite different. Scaling is not a major concern, and the rate of effective in-situ media regeneration is the main criterion to govern the process and higher product quality can be easily achievable even with high flow rate but the main limitation is the higher pressure drop across the dilute chamber in regular flow mode.

The previously mentioned fractional deionization process of U.S. Pat. No. 6,896,814 B2 is a two stage process that deals with hardness and silica removal in separate zones because of their different current requirement. The design of an apparatus for this reason has two stages and is able to produce product flow rate up to 5.0 m3/hr with its regular flow mode. This process/apparatus when used for double pass RO grade water with novel split flow design is able to treat as high as 8 to 10 m3/hr of product water against normally product flow rate which is 3 to 5 m3/hr. Single stack with 8 to 10 m3/hr reduces the line connections, minimize pressure drop across dilute chamber, reduce power consumption per unit volume of water and makes a economical and viable proposition for the user.

BRIEF SUMMARY OF THE INVENTION

To attempt to overcome the limitation of high pressure drop, more cell pair or increased unit area for high flow rate and mechanical leaks through EDI apparatus, we provide the unique EDI apparatus design reported herein. Embodiments of the invention may overcome one or more of the limitations, and may be capable of producing high product flow rate in the ranges of 5.0 m3/hr to 10.0 m3/hr for treating $2^{nd}$ pass RO permeate water to produced ultra pure level, more than 1.0 MOhms/cm product (generally 10 to 16 MOhms·cm product water) with only 30-35 cell pairs. The output product flow rate through each dilute camber of embodiments of this new EDI apparatus is 150 to 280 LPH which is almost double of the conventional EDI apparatus. The design of the new EDI apparatus has the flexibility to operate in conventional mode if single pass RO permeate water is provided as feedwater.

DETAILED DESCRIPTION OF THE INVENTION

An EDI apparatus provided by an embodiment of the invention generally comprises the following main components—
  Dilute chambers (typically 30-35 in number)
  Concentrate chambers (typically 31-36 in number)
  Electrode chambers (02 in number) which contains anode and cathode electrodes
  Metal End plates (02 in numbers)
  Outer covers.

In most of the cases the single pass RO permeate used as feed water contains Feed conductivity equivalent (FCE) ranges between 10 and 40 µS/cm with high scaling ions like Calcium, Magnesium, bicarbonates, silica and $CO_2$, whereas the $2^{nd}$ pass RO feed water generally contains less than 10 µS/cm FCE, with negligible amounts of $CO_2$ and silica. For treating such $2^{nd}$ pass RO permeate water a minimum resin bed length is sufficient for producing more than 10 Megaohms/cm ultra pure water.

Figure 3:
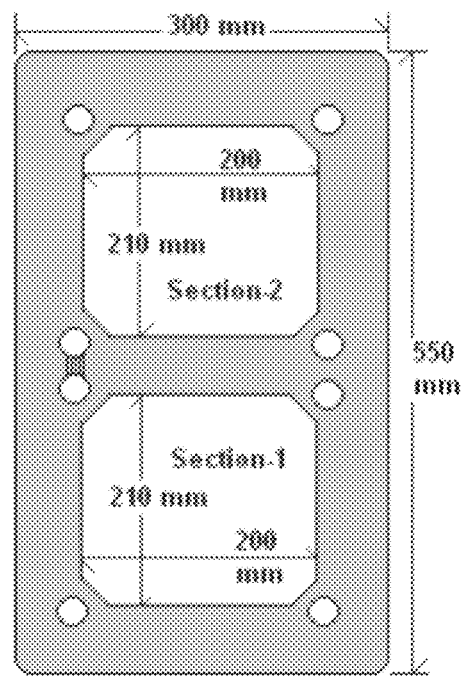
FIG. 3 shows an exemplary embodiment of a dilute spacer including dimensions suitable for use in an embodiment of the invention.

Based on this finding a new split flow EDI apparatus has been designed which has two sections (sections 1 & 2, as shown in FIG. 3). The total length of spacer is designed to 550 mm with an effective resin bed length of 200-220 mm, preferably 210 mm in each section, and the total width of spacer is designed to 300 mm with effective resin bed width of 200 mm in each section. The thickness of dilute chamber is 11 mm with net volume of 396 $cm^3$ and net membrane surface area of 360 $cm^2$ in each section. Of course these dimensions are for an exemplary embodiment and should not be implied to limit the claims.

This allows a stack design embodying a novel split flow EDI concept, wherein one can maximize the flow through the EDI stack by splitting the flow through the stack into two parts.

Figure 1:
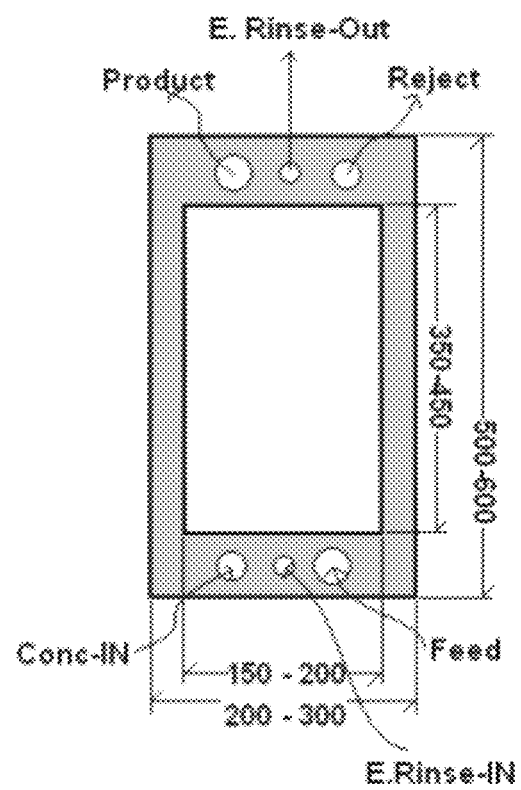
FIG. 1 shows the flow configuration of a conventional EDI apparatus.
Figure 2:
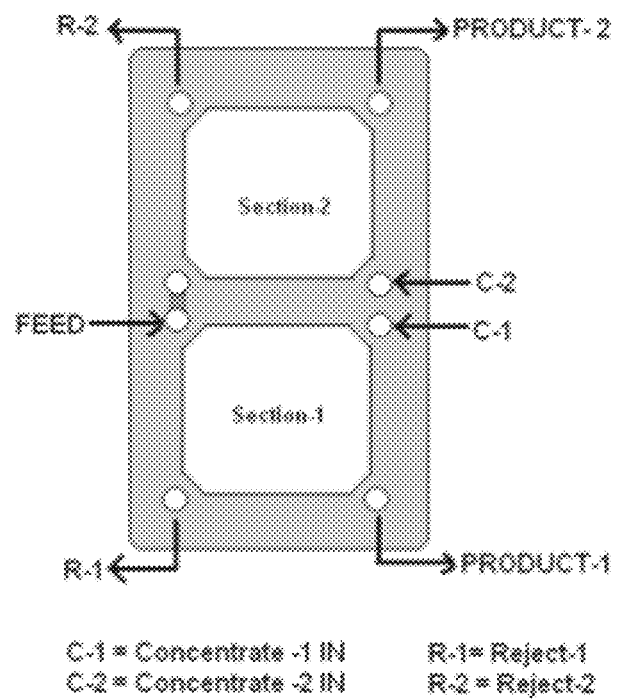
FIG. 2 shows a schematic view of a split-flow EDI apparatus according to an embodiment of the invention.

During operation of a typical embodiment, the feed water is fed through the center port and is diverted into each section of dilute chamber with equal flow rate and produced two products (Product-1 & Product-2, as shown in FIG. 2). The EDI apparatus has similar design concentrate chambers where two separate concentrate streams that flush the removed ions from the dilute chambers.

One unique feature of this concept is flow patterns within the stack. The flow patterns have a combination of up-flow and down flow. The lower part of the stack operates in a down flow mode and the upper part of the stack operates in an up-flow mode. The dilute and concentrate chambers follow similar flow patterns and remain co-flow with each other. Since the water flows happen through half of the stack length, water volume processed can be increased for the same pressure drop, and a similar quantity of water can be processed through the other half.

The split flow design reduces resin bed depth required for processing of second pass RO permeate water. This results in higher flow rate through the stack and reduces power consumption per unit volume of water compared to typical EDI.

Figure 4:
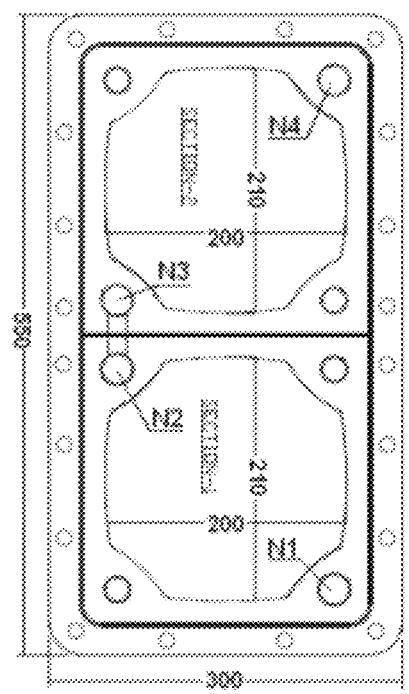
FIG. 4 shows a new design of a dilute chamber of the invention.

For treating $2^{nd}$ pass RO permeate water, the RO permeate water may be fed through the port N2 (1-inch), shown in FIG. 4, which is then distributed into each section of dilute chamber with equal flow rate and ultimately produces two products (Product-1 & Product-2) which come out from Port N1 and N4 (both 1-inch). Thus each section acts as an independent dilute chamber. Product output flow is doubled over a single-section dilute chamber. The EDI apparatus has concentrate chambers where two separate concentrate streams removed ions from respective dilute chambers. The Electrode Rinse chamber is also designed with a similar configuration having two separate electrodes for each section at each ends. The typical view of dilute spacer and dilute chamber flow configuration of new EDI apparatus is shown in FIG. 3 and FIG. 4 respectively.

Concentrate Chamber:

The concentrate spacer of new EDI apparatus (FIG. 5) contains conducting mesh of 1.0-2.0 mm thick and the total thickness of concentrate chamber is 2.0-3.0 mm including gaskets. The EDI apparatus has two separate concentrate streams for both section 1&2 and the flow is co-current of dilute flow for each section as shown in FIG. 5.

Figure 5:
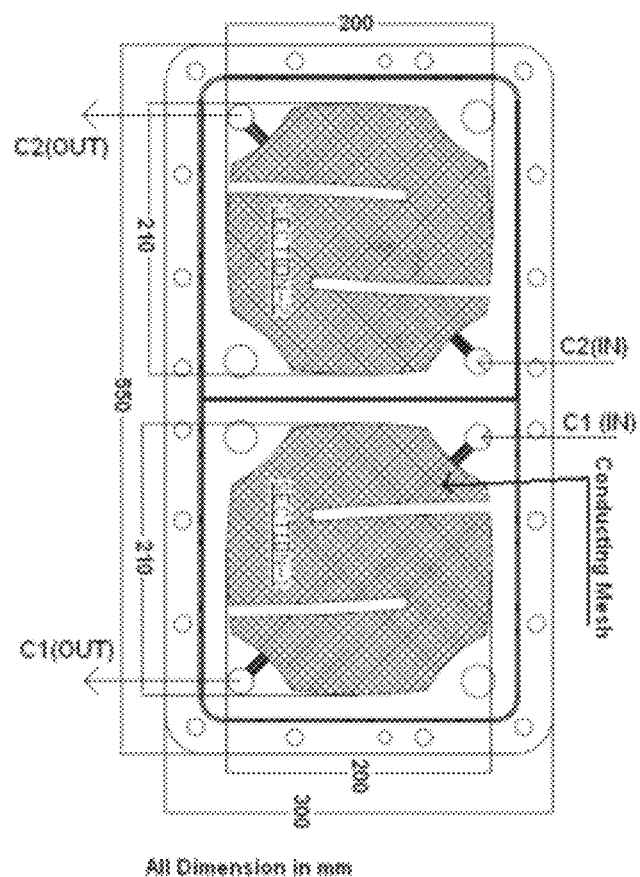
FIG. 5 shows an embodiment of a concentrate chamber of the invention.

A typical view of a concentrate chamber flow configuration used in an embodiment of our EDI apparatus is shown in FIG. 5

Figure 6:
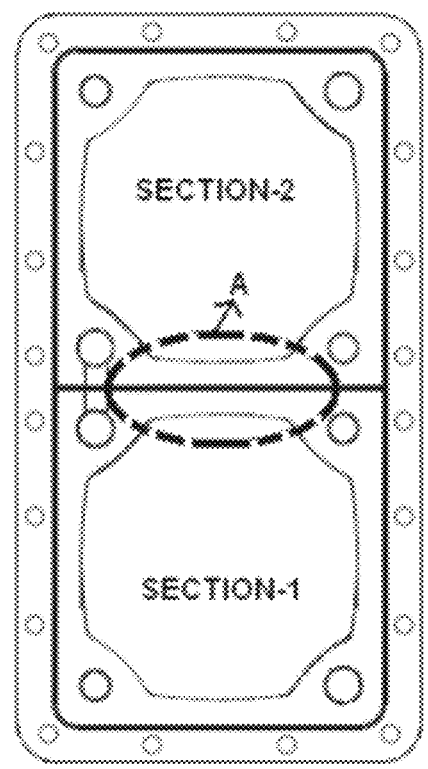
FIG. 6 shows a spacer of the invention with an emphasis on the middle rib at A.

Another special feature of embodiments of our EDI apparatus is a middle solid supporting rib included in the components/spacers. An example of a rib is shown as Part A of FIG. 6. The ribs play an important role and have following features:
- Separate and differentiate the two sections and accommodate two sections in a lesser foot print.
- Provide an ability to install inlet and flow distribution nozzles to split flows between two sections.
- Provide mechanical strength to the components/spacers, and
- Prevent the components/spacers from bulging which generally observed in conventional EDI spacer if length would be larger due the resin compression pressure in dilute chambers.

Figure 7:
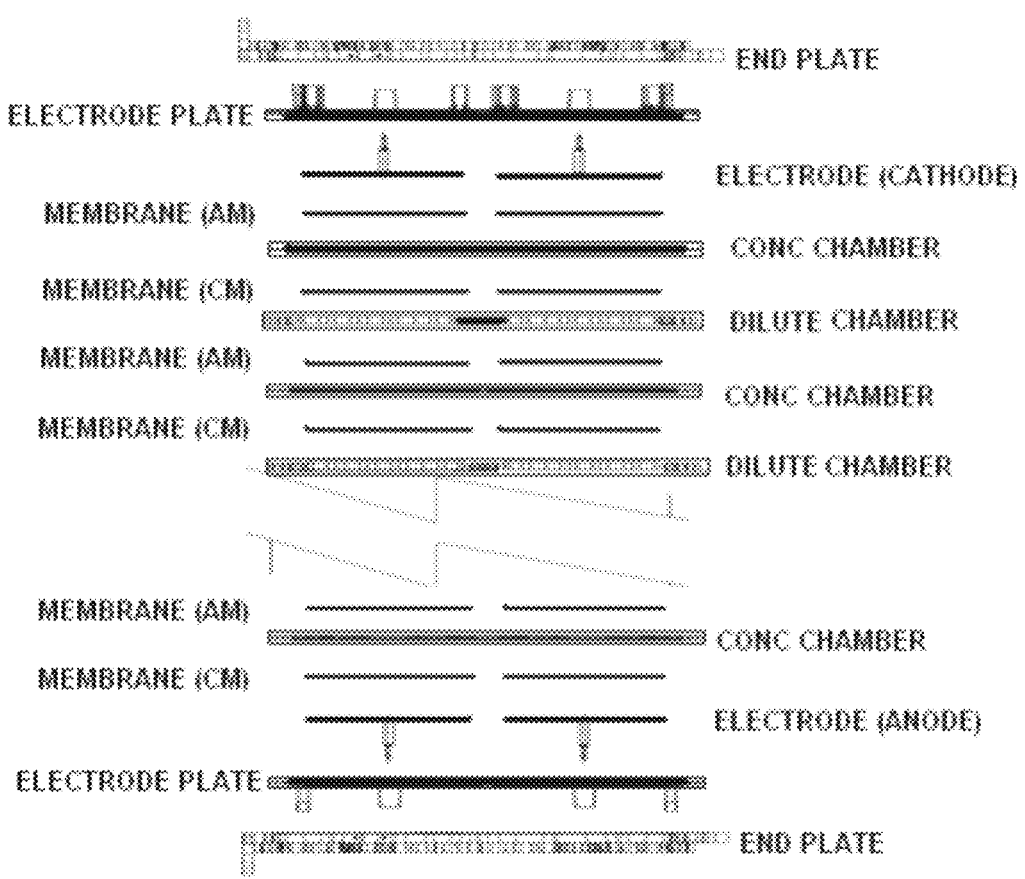
FIG. 7 shows an EDI assembly according to one embodiment of the invention.

New EDI Apparatus Assembly:

An embodiment of the new EDI apparatus may be assembled in the following manner, with a typical assembly shown in FIG. 7:

The cathode chamber is formed by placing anion membranes in each section of Electrode housing plate (EHP) which contains two cathodes and cation resin media in each section. The cathodes may be, for example, SS-316 cathodes.

Then a concentrate chamber is formed by placing concentrate spacer (CS) over anion membranes of cathode chamber. The concentrate spacer contains conducting mesh in each section.

The dilute chambers is formed by placing cation membranes on each section of new design dilute spacer facing towards cathode and by placing anion membranes on each section of dilute spacer facing towards anode. The resin media is accommodated in each section of dilute spacer between two membranes.

The another adjacent concentrate chambers are formed placing concentrate spacer in which the anion membrane of each section faces towards the cathode side and the cation membrane faces towards the anode side.

One dilute chamber and one concentrate chamber forms one cell pair. Typically 30-35 cell pair of dilute and concentrate chambers are assembled.

An anode chamber is formed after last concentrate chamber by placing an electrode housing plate (EHP) which contains two titanium anodes and cation resin media in each section.

Finally the whole 30-35 cell pair of dilute and concentrate chambers and two electrode chambers are tighten by two end plate (EP), one at each end, with the help of stainless steel (SS) studs.

Spacers may be separated by rings, preferably EPDM (ethylene propylene diene monomer) to prevent leakage of water during operation.

Figure 8:
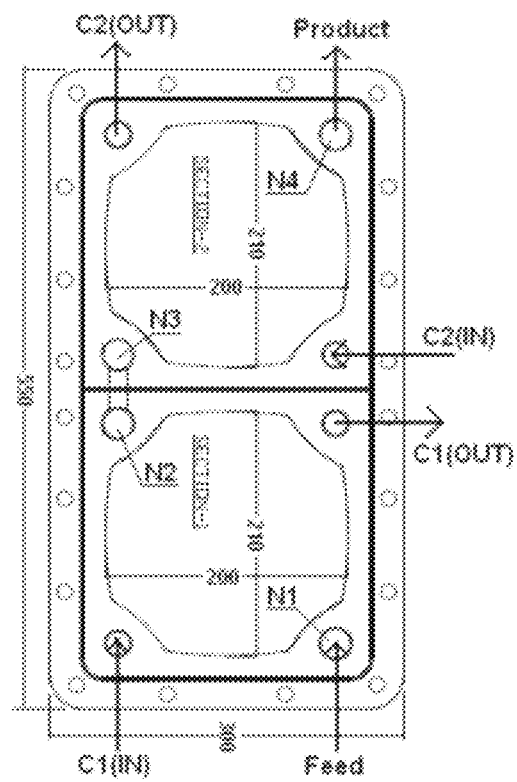
FIG. 8 shows flow configuration of an embodiment of the new EDI dilute spacer for single pass RO permeate water.

Description of New Design EDI Apparatus for Treating Single Pass RO Permeate Water:

Embodiments of the new EDI apparatus design have the flexibility to operate for higher conducting (more than 10 μS/cm) RO permeate water (single pass RO) in the alternative to second-pass RO permeate water. In case of single pass RO, the permeate water is fed from the port N1 (typically a 1-inch port) and the section-1 product (D1) entered in section-2 from port N3 as Port N2 and N3 has interconnectivity and finally the purified product comes out from port N4. Two separate concentrate streams also flow in adjacent concentrate chambers as co-current as shown in FIG. 8

EXAMPLES

A series of trials were conducted on new design EDI apparatus with 30-35 cell pair configuration.

Comparative Example-1

Conventional Mode

A 30-cell pair stack was assembled and tested with regular flow mode with feed at the bottom and product at the top. The stack tested for 71 hrs with product flow of 3.5 m3/hr to 5.0 m3/hr flow with feed FCE of 10 μS/cm. The stack configuration was: —
- Dilute chambers—30 nos with resin media
- Concentrate chambers—31 nos with conducting mesh
- Electrode chambers—$O_2$ nos.
- End plates—$O_2$ number
- Electrode: anode—Titanium and Cathode—SS-316
- Membrane: Heterogeneous Ion exchange membranes
- Effective Membrane area of dilute chamber—4.32 m2

The product quality of stack was more than 16 MegaOhms·cm with higher pressure dilute drop. At 3.5 m3/hr product flow, dilute pressure drop was 27 psi, at 4.0 m3/hr it was 34 psi, at 4.5 psi it was increased to 43 psi and at maximum 5.0 m3/hr it reached up to 50 psi. The feed temperature was around 25° C. The summarized data of comparative stack are in table-1:

TABLE 1

| Comparative example stack data: | | | | | | | |
|---|---|---|---|---|---|---|---|
| Stack | Feed | | Dilute | Product | Product | Section-1 | |
| Op. Hrs | FCE μS/cm | Feed pH | ΔP psi | Flow LPH | Resistivity M-ohms·cm | Voltage VDC | Current amps |
| 11 | 10.4 | 6.2 | 27 | 3500 | 15.71 | 250 | 1.2 |
| 20 | 9.7 | 6.7 | 27 | 3500 | 17.08 | 250 | 1.2 |
| 30 | 10.3 | 6.6 | 27 | 3500 | 16.75 | 250 | 1.3 |
| 40 | 9.7 | 6.7 | 27 | 3500 | 17.45 | 250 | 1.3 |

TABLE 1-continued

Comparative example stack data:

| | | | | | | | |
|---|---|---|---|---|---|---|---|
| 50 | 9.5 | 6.6 | 27 | 3500 | 17.63 | 250 | 1.4 |
| 55 | 9.8 | 6.6 | 27 | 3500 | 17.61 | 250 | 1.4 |
| 57 | 10.5 | 6.5 | 34 | 4000 | 17.35 | 250 | 1.5 |
| 58 | 10.9 | 6.5 | 34 | 4000 | 17.25 | 250 | 1.6 |
| 59 | 10.8 | 6.5 | 34 | 4000 | 17.00 | 250 | 1.6 |
| 60 | 8.9 | 6.6 | 34 | 4000 | 17.00 | 250 | 1.6 |
| 61 | 9.5 | 6.6 | 34 | 4000 | 17.10 | 250 | 1.6 |
| 62 | 9.5 | 6.6 | 34 | 4000 | 17.25 | 250 | 1.6 |
| 63 | 10.1 | 6.6 | 34 | 4000 | 17.20 | 250 | 1.6 |
| 64 | 9.1 | 6.6 | 43 | 4500 | 16.68 | 250 | 1.6 |
| 65 | 10.5 | 6.5 | 43 | 4500 | 16.59 | 250 | 1.5 |
| 66 | 10.9 | 6.4 | 43 | 4500 | 16.70 | 250 | 1.5 |
| 67 | 10.5 | 6.5 | 43 | 4500 | 16.50 | 250 | 1.5 |
| 68 | 9.0 | 6.5 | 50 | 5000 | 16.20 | 250 | 1.5 |
| 69 | 10.5 | 6.4 | 50 | 5000 | 16.10 | 250 | 1.4 |
| 70 | 10.2 | 6.3 | 50 | 5000 | 16.15 | 250 | 1.4 |
| 71 | 10.3 | 6.5 | 50 | 5000 | 16.10 | 250 | 1.6 |

| Stack | Feed | | Dilute | Product | Product | Section-2 | | C1(OUT) | C2(OUT) | E.Rinse |
|---|---|---|---|---|---|---|---|---|---|---|
| Op. Hrs | FCE μS/cm | Feed pH | ΔP psi | Flow LPH | Resistivity M-ohms·cm | Voltage VDC | Current amps | Flow LPH | flow LPH | Flow LPH |
| 11 | 10.4 | 6.2 | 27 | 3500 | 15.71 | 350 | 2.5 | 250 | 250 | 100 |
| 20 | 9.7 | 6.7 | 27 | 3500 | 17.08 | 350 | 2.7 | 250 | 250 | 100 |
| 30 | 10.3 | 6.6 | 27 | 3500 | 16.75 | 350 | 2.5 | 250 | 250 | 100 |
| 40 | 9.7 | 6.7 | 27 | 3500 | 17.45 | 350 | 2.5 | 250 | 250 | 100 |
| 50 | 9.5 | 6.6 | 27 | 3500 | 17.63 | 350 | 2.8 | 250 | 250 | 100 |
| 55 | 9.8 | 6.6 | 27 | 3500 | 17.61 | 350 | 3.0 | 250 | 250 | 100 |
| 57 | 10.5 | 6.5 | 34 | 4000 | 17.35 | 350 | 2.9 | 250 | 250 | 100 |
| 58 | 10.9 | 6.5 | 34 | 4000 | 17.25 | 350 | 2.9 | 250 | 250 | 100 |
| 59 | 10.8 | 6.5 | 34 | 4000 | 17.00 | 350 | 2.9 | 250 | 250 | 100 |
| 60 | 8.9 | 6.6 | 34 | 4000 | 17.00 | 350 | 2.9 | 250 | 250 | 100 |
| 61 | 9.5 | 6.6 | 34 | 4000 | 17.10 | 350 | 2.9 | 250 | 250 | 100 |
| 62 | 9.5 | 6.6 | 34 | 4000 | 17.25 | 350 | 2.8 | 250 | 250 | 100 |
| 63 | 10.1 | 6.6 | 34 | 4000 | 17.20 | 350 | 3.0 | 250 | 250 | 100 |
| 64 | 9.1 | 6.6 | 43 | 4500 | 16.68 | 350 | 2.9 | 250 | 250 | 100 |
| 65 | 10.5 | 6.5 | 43 | 4500 | 16.59 | 350 | 2.9 | 250 | 250 | 100 |
| 66 | 10.9 | 6.4 | 43 | 4500 | 16.70 | 350 | 2.8 | 250 | 250 | 100 |
| 67 | 10.5 | 6.5 | 43 | 4500 | 16.50 | 350 | 2.8 | 250 | 250 | 100 |
| 68 | 9.0 | 6.5 | 50 | 5000 | 16.20 | 350 | 2.8 | 250 | 250 | 100 |
| 69 | 10.5 | 6.4 | 50 | 5000 | 16.10 | 350 | 2.8 | 250 | 250 | 100 |
| 70 | 10.2 | 6.3 | 50 | 5000 | 16.15 | 350 | 2.8 | 250 | 250 | 100 |
| 71 | 10.3 | 6.5 | 50 | 5000 | 16.10 | 350 | 2.7 | 250 | 250 | 100 |

Example 2

One new split flow design EDI apparatus with 30-cell pair was assembled with the following components:
  Dilute chambers—30 in number with resin media
  Concentrate chambers—31 in number with conducting mesh
  Electrode chambers—$O_2$ in number
  End plates—$O_2$ in number
  Electrode: anode—Titanium and Cathode—SS-316
  Membrane: Heterogeneous Ion exchange membranes
  Effective Membrane area of dilute chamber—4.32 m2
The EDI apparatus has been tested for following product flow rate and feed FCE load A—Product flow rate*=5.0 m3/hr (5000 LPH) with feed FCE of 9 to 10 (table-1)
B—Product Flow rate*=6.0 m3/hr (6000 Lph) with Feed FCE of 1.0 to 10 (table-2)
C—Product flow rate*=7.0 m/hr (7000 Lph) with Feed FCE of 1.0 to 10 (table-3)
Note: * product Flow Rate=Product-1 flow+product-2 flow)

The stack product quality in above three flow conditions is always more than 10 MOhms·cm. The applied current is maintained in between 2.0 amps and 3.0 amps in each section (section-1 & 2). The product silica quality is always around 10 ppb from feed silica of 50 ppb to 100 ppb.

The stack data of above conditions are summarized in table-2 to table-4.

TABLE 2

(stack Quality with 5.0 m3/hr (5000 LPH) product flow rate)

| FEED FCE μS/cm | FEED pH | ΔP psi | Product Flow LPH | Product Resistivity Mohms·cm | Voltage section-1 VDC |
|---|---|---|---|---|---|
| 9.1 | 7.2 | 18 | 5000 | 13.91 | 334 |
| 9.2 | 6.7 | 18 | 5000 | 13.90 | 330 |
| 9.3 | 6.7 | 18 | 5000 | 13.93 | 330 |
| 9.4 | 7.0 | 18 | 5000 | 12.70 | 326 |

TABLE 2-continued (stack Quality with 5.0 m3/hr (5000 LPH) product flow rate)

| | | | | | |
|---|---|---|---|---|---|
| 9.5 | 6.9 | 18 | 5000 | 12.48 | 326 |
| 9.6 | 6.8 | 18 | 5000 | 12.35 | 327 |
| 9.8 | 6.6 | 16 | 5000 | 12.97 | 337 |
| 9.9 | 6.7 | 16 | 5000 | 12.49 | 328 |
| 9.9 | 6.9 | 16 | 5000 | 12.35 | 327 |
| 10.1 | 6.7 | 18 | 5000 | 11.80 | 325 |
| 10.2 | 6.8 | 18 | 5000 | 12.22 | 330 |
| 10.3 | 6.9 | 16 | 5000 | 12.11 | 326 |
| 10.5 | 6.8 | 16 | 5000 | 12.05 | 326 |
| 10.7 | 6.8 | 18 | 5000 | 12.20 | 330 |

| FEED FCE µS/cm | FEED pH | ΔP psi | Product Flow LPH | Product Resistivity Mohms·cm | Current A-2 ADC | C1(OUT) Flow LPH | C2(OUT) Flow LPH | Feed Silica Ppb | Product Silica ppb |
|---|---|---|---|---|---|---|---|---|---|
| 9.1 | 7.2 | 18 | 5000 | 13.91 | 3.00 | 200 | 200 | | |
| 9.2 | 6.7 | 18 | 5000 | 13.90 | 2.98 | 200 | 200 | | |
| 9.3 | 6.7 | 18 | 5000 | 13.93 | 3.00 | 200 | 200 | 79 | 11 |
| 9.4 | 7.0 | 18 | 5000 | 12.70 | 2.99 | 200 | 200 | | |
| 9.5 | 6.9 | 18 | 5000 | 12.48 | 2.99 | 200 | 200 | 83 | 10 |
| 9.6 | 6.8 | 18 | 5000 | 12.35 | 2.99 | 200 | 200 | | |
| 9.8 | 6.6 | 16 | 5000 | 12.97 | 3.00 | 200 | 200 | | |
| 9.9 | 6.7 | 16 | 5000 | 12.49 | 3.00 | 200 | 200 | 84 | 9 |
| 9.9 | 6.9 | 16 | 5000 | 12.35 | 2.99 | 200 | 200 | 98 | 11 |
| 10.1 | 6.7 | 18 | 5000 | 11.80 | 3.00 | 200 | 200 | | |
| 10.2 | 6.8 | 18 | 5000 | 12.22 | 2.99 | 200 | 200 | 81 | 9 |
| 10.3 | 6.9 | 16 | 5000 | 12.11 | 2.99 | 200 | 200 | | |
| 10.5 | 6.8 | 16 | 5000 | 12.05 | 2.99 | 200 | 200 | | |
| 10.7 | 6.8 | 18 | 5000 | 12.20 | 2.98 | 200 | 200 | | |

TABLE 3

Stack Quality with 6.0 m3/hr (6000 LPH) Product Flow Rate

| FEED FCE µS/cm | FEED pH | ΔP psi | Product Flow LPH | Product Resistivity Mohms·cm | Voltage section-1 Vdc | Current section-1 Amps |
|---|---|---|---|---|---|---|
| 0.9 | 5.9 | 25 | 6000 | 17.56 | 270 | 2.01 |
| 1.2 | 6.6 | 24 | 6000 | 17.45 | 257 | 2.01 |
| 1.3 | 6.6 | 26 | 6000 | 17.20 | 257 | 2.03 |
| 1.4 | 6.4 | 25 | 6000 | 17.20 | 281 | 2.05 |
| 1.5 | 6.3 | 26 | 6000 | 17.15 | 258 | 2.03 |
| 1.6 | 6.4 | 25 | 6000 | 16.67 | 266 | 2.01 |
| 1.7 | 6.4 | 26 | 6000 | 17.10 | 263 | 2.00 |
| 1.7 | 6.5 | 26 | 6000 | 17.36 | 258 | 2.04 |
| 1.7 | 6.1 | 25 | 6000 | 16.75 | 266 | 2.02 |
| 1.8 | 6.3 | 25 | 6000 | 16.34 | 266 | 2.02 |
| 1.9 | 6.5 | 26 | 6000 | 17.33 | 260 | 2.04 |
| 2.0 | 6.2 | 25 | 6000 | 16.47 | 265 | 2.07 |
| 2.1 | 6.8 | 26 | 6000 | 16.95 | 258 | 2.03 |
| 2.2 | 6.3 | 25 | 6000 | 16.46 | 271 | 2.07 |
| 2.8 | 6.4 | 26 | 6000 | 17.09 | 256 | 2.03 |
| 3.6 | 6.1 | 27 | 6000 | 16.02 | 315 | 2.01 |
| 3.6 | 6.1 | 28 | 6000 | 16.92 | 334 | 2.03 |
| 3.7 | 6.0 | 27 | 6000 | 16.92 | 337 | 2.01 |
| 3.8 | 6.3 | 25 | 6000 | 15.93 | 301 | 2.04 |
| 3.8 | 6.2 | 27 | 6000 | 16.94 | 348 | 2.01 |
| 3.8 | 6.2 | 27 | 6000 | 17.09 | 327 | 1.98 |
| 3.9 | 6.3 | 28 | 6000 | 16.69 | 327 | 2.00 |
| 4.0 | 6.2 | 27 | 6000 | 16.02 | 307 | 2.02 |
| 4.0 | 6.3 | 26 | 6000 | 16.52 | 319 | 1.99 |
| 4.0 | 6.2 | 26 | 6000 | 16.68 | 326 | 1.99 |
| 4.0 | 6.5 | 26 | 6000 | 16.78 | 320 | 1.99 |
| 4.0 | 6.4 | 27 | 6000 | 16.89 | 334 | 2.00 |
| 4.0 | 6.3 | 27 | 6000 | 16.89 | 318 | 2.03 |
| 4.0 | 6.9 | 28 | 6000 | 16.20 | 340 | 2.02 |
| 4.1 | 6.4 | 26 | 6000 | 16.72 | 320 | 1.99 |
| 4.2 | 6.4 | 26 | 6000 | 16.42 | 312 | 2.00 |
| 4.3 | 6.5 | 26 | 6000 | 16.69 | 320 | 1.99 |
| 4.4 | 6.5 | 27 | 6000 | 16.34 | 323 | 2.05 |
| 4.5 | 6.5 | 27 | 6000 | 16.42 | 330 | 2.02 |
| 4.6 | 6.5 | 27 | 6000 | 16.86 | 349 | 2.02 |
| 4.7 | 6.4 | 28 | 6000 | 16.51 | 333 | 2.01 |
| 4.8 | 6.2 | 25 | 6000 | 15.59 | 289 | 2.01 |

TABLE 3-continued

Stack Quality with 6.0 m3/hr (6000 LPH) Product Flow Rate

| | | | | | | |
|---|---|---|---|---|---|---|
| 4.9 | 6.4 | 28 | 6000 | 15.88 | 334 | 2.01 |
| 5.0 | 6.4 | 28 | 6000 | 16.83 | 325 | 2.03 |
| 5.0 | 6.3 | 28 | 6000 | 16.05 | 321 | 2.02 |
| 5.0 | 6.5 | 28 | 6000 | 16.36 | 338 | 2.01 |
| 5.0 | 6.4 | 28 | 6000 | 15.90 | 332 | 2.01 |
| 5.0 | 6.4 | 28 | 6000 | 16.19 | 333 | 2.02 |
| 5.1 | 6.4 | 28 | 6000 | 16.09 | 323 | 2.01 |
| 5.1 | 6.4 | 28 | 6000 | 16.06 | 325 | 2.01 |
| 5.1 | 6.3 | 28 | 6000 | 16.29 | 332 | 2.01 |
| 5.2 | 6.4 | 28 | 6000 | 15.78 | 334 | 2.03 |
| 5.3 | 6.5 | 24 | 6000 | 14.35 | 283 | 2.50 |
| 5.4 | 6.8 | 24 | 6000 | 14.55 | 283 | 2.51 |
| 5.4 | 6.8 | 24 | 6000 | 14.38 | 286 | 2.50 |
| 5.6 | 6.7 | 24 | 6000 | 14.54 | 282 | 2.52 |
| 5.8 | 6.9 | 24 | 6000 | 14.92 | 280 | 2.50 |
| 5.9 | 6.3 | 27 | 6000 | 15.74 | 366 | 2.50 |
| 6.0 | 6.3 | 27 | 6000 | 15.75 | 358 | 2.53 |
| 6.0 | 6.6 | 27 | 6000 | 15.57 | 361 | 2.51 |
| 6.4 | 7.6 | 29 | 6000 | 16.94 | 366 | 2.52 |
| 6.9 | 7.0 | 28 | 6000 | 15.86 | 358 | 2.51 |
| 7.0 | 7.0 | 28 | 6000 | 16.50 | 371 | 2.51 |
| 8.0 | 7.0 | 30 | 6000 | 16.18 | 370 | 2.51 |
| 8.4 | 7.5 | 29 | 6000 | 16.38 | 370 | 2.53 |
| 8.5 | 7.7 | 30 | 6000 | 15.82 | 364 | 2.53 |
| 8.9 | 6.8 | 24 | 6000 | 11.25 | 324 | 2.98 |
| 9.0 | 7.3 | 30 | 6000 | 11.10 | 368 | 2.52 |
| 9.1 | 6.6 | 24 | 6000 | 11.50 | 329 | 2.98 |
| 9.2 | 6.6 | 24 | 6000 | 11.35 | 328 | 3.00 |
| 9.6 | 6.7 | 24 | 6000 | 11.09 | 334 | 3.00 |

| FEED FCE μS/cm | FEED pH | ΔP psi | Product Flow LPH | Product Resistivity Mohms·cm | Voltage section-2 Vdc | Current section-2 amps | C1(OUT) Flow LPH | C2(OUT) flow LPH | FEED Silica ppb | Product Silica ppb |
|---|---|---|---|---|---|---|---|---|---|---|
| 0.9 | 5.9 | 25 | 6000 | 17.56 | 278 | 2.03 | 200 | 200 | | |
| 1.2 | 6.6 | 24 | 6000 | 17.45 | 260 | 2.00 | 200 | 200 | 44 | 9 |
| 1.3 | 6.6 | 26 | 6000 | 17.20 | 260 | 2.03 | 200 | 200 | | |
| 1.4 | 6.4 | 25 | 6000 | 17.20 | 283 | 2.03 | 200 | 200 | 37 | 8 |
| 1.5 | 6.3 | 26 | 6000 | 17.15 | 259 | 2.02 | 200 | 200 | | |
| 1.6 | 6.4 | 25 | 6000 | 16.67 | 270 | 2.02 | 200 | 200 | 180 | 12 |
| 1.7 | 6.4 | 26 | 6000 | 17.10 | 265 | 2.02 | 200 | 200 | 38 | 10 |
| 1.7 | 6.5 | 26 | 6000 | 17.36 | 260 | 2.03 | 200 | 200 | 36 | 5 |
| 1.7 | 6.1 | 25 | 6000 | 16.75 | 263 | 2.01 | 200 | 200 | 76 | 11 |
| 1.8 | 6.3 | 25 | 6000 | 16.34 | 263 | 2.01 | 200 | 200 | 160 | 15 |
| 1.9 | 6.5 | 26 | 6000 | 17.33 | 260 | 2.03 | 200 | 200 | 38 | 10 |
| 2.0 | 6.2 | 25 | 6000 | 16.47 | 261 | 2.02 | 200 | 200 | | |
| 2.1 | 6.8 | 26 | 6000 | 16.95 | 259 | 2.04 | 200 | 200 | | |
| 2.2 | 6.3 | 25 | 6000 | 16.46 | 267 | 2.01 | 200 | 200 | 57 | 9 |
| 2.8 | 6.4 | 26 | 6000 | 17.09 | 258 | 2.03 | 200 | 200 | 34 | 7 |
| 3.6 | 6.1 | 27 | 6000 | 16.02 | 359 | 2.02 | 250 | 250 | | |
| 3.6 | 6.1 | 28 | 6000 | 16.92 | 369 | 2.02 | 250 | 250 | 35 | 9 |
| 3.7 | 6.0 | 27 | 6000 | 16.92 | 373 | 2.03 | 250 | 250 | 27 | 8 |
| 3.8 | 6.3 | 25 | 6000 | 15.93 | 346 | 2.04 | 250 | 250 | 34 | 8 |
| 3.8 | 6.2 | 27 | 6000 | 16.94 | 379 | 2.00 | 250 | 250 | 30 | 8 |
| 3.8 | 6.2 | 27 | 6000 | 17.09 | 362 | 1.99 | 250 | 250 | 37 | 9 |
| 3.9 | 6.3 | 28 | 6000 | 16.69 | 365 | 2.00 | 250 | 250 | 47 | 9 |
| 4.0 | 6.2 | 27 | 6000 | 16.02 | 350 | 2.03 | 250 | 250 | | |
| 4.0 | 6.3 | 26 | 6000 | 16.52 | 359 | 2.00 | 250 | 250 | 41 | 9 |
| 4.0 | 6.2 | 26 | 6000 | 16.68 | 366 | 1.98 | 250 | 250 | 29 | 8 |
| 4.0 | 6.5 | 26 | 6000 | 16.78 | 358 | 2.01 | 250 | 250 | 33 | 10 |
| 4.0 | 6.4 | 27 | 6000 | 16.89 | 370 | 2.01 | 250 | 250 | 40 | 8 |
| 4.0 | 6.3 | 27 | 6000 | 16.89 | 337 | 2.02 | 250 | 250 | 54 | 14 |
| 4.0 | 6.9 | 28 | 6000 | 16.20 | 365 | 2.05 | 250 | 250 | 60 | 11 |
| 4.1 | 6.4 | 26 | 6000 | 16.72 | 359 | 2.00 | 250 | 250 | | |
| 4.2 | 6.4 | 26 | 6000 | 16.42 | 352 | 2.01 | 250 | 250 | | |
| 4.3 | 6.5 | 26 | 6000 | 16.69 | 358 | 2.01 | 250 | 250 | | |
| 4.4 | 6.5 | 27 | 6000 | 16.34 | 346 | 2.03 | 250 | 250 | 101 | 13 |
| 4.5 | 6.5 | 27 | 6000 | 16.42 | 356 | 2.02 | 250 | 250 | | |
| 4.6 | 6.5 | 27 | 6000 | 16.86 | 378 | 2.02 | 250 | 250 | 108 | 13 |
| 4.7 | 6.4 | 28 | 6000 | 16.51 | 357 | 2.01 | 250 | 250 | | |
| 4.8 | 6.2 | 25 | 6000 | 15.59 | 290 | 2.00 | 200 | 200 | 43 | 8 |
| 4.9 | 6.4 | 28 | 6000 | 15.88 | 358 | 2.0 | 250 | 250 | 69 | 13 |
| 5.0 | 6.4 | 28 | 6000 | 16.83 | 350 | 2.02 | 250 | 250 | 44 | 10 |
| 5.0 | 6.3 | 28 | 6000 | 16.05 | 345 | 2.02 | 250 | 250 | 75 | 12 |
| 5.0 | 6.5 | 28 | 6000 | 16.36 | 360 | 2.01 | 250 | 250 | 79 | 14 |
| 5.0 | 6.4 | 28 | 6000 | 15.90 | 357 | 2.03 | 250 | 250 | 65 | 13 |
| 5.0 | 6.4 | 28 | 6000 | 16.19 | 354 | 2.01 | 250 | 250 | 66 | 14 |
| 5.1 | 6.4 | 28 | 6000 | 16.09 | 347 | 2.01 | 250 | 250 | 71 | 13 |

TABLE 3-continued

Stack Quality with 6.0 m3/hr (6000 LPH) Product Flow Rate

| 5.1 | 6.4 | 28 | 6000 | 16.06 | 349 | 2.01 | 250 | 250 | 61 | 13 |
|---|---|---|---|---|---|---|---|---|---|---|
| 5.1 | 6.3 | 28 | 6000 | 16.29 | 357 | 2.01 | 250 | 250 | 49 | 12 |
| 5.2 | 6.4 | 28 | 6000 | 15.78 | 355 | 2.02 | 250 | 250 | 66 | 13 |
| 5.3 | 6.5 | 24 | 6000 | 14.35 | 286 | 2.50 | 150 | 150 | 46 | 11 |
| 5.4 | 6.8 | 24 | 6000 | 14.55 | 288 | 2.52 | 150 | 150 | 65 | 11 |
| 5.4 | 6.8 | 24 | 6000 | 14.38 | 289 | 2.50 | 150 | 150 | 75 | 11 |
| 5.6 | 6.7 | 24 | 6000 | 14.54 | 287 | 2.51 | 150 | 150 | | |
| 5.8 | 6.9 | 24 | 6000 | 14.92 | 283 | 2.50 | 150 | 150 | 71 | 12 |
| 5.9 | 6.3 | 27 | 6000 | 15.74 | 386 | 2.52 | 250 | 250 | 76 | 14 |
| 6.0 | 6.3 | 27 | 6000 | 15.75 | 387 | 2.59 | 250 | 250 | | |
| 6.0 | 6.6 | 27 | 6000 | 15.57 | 386 | 2.55 | 250 | 250 | 54 | 11 |
| 6.4 | 7.6 | 29 | 6000 | 16.94 | 384 | 2.52 | 200 | 200 | | |
| 6.9 | 7.0 | 28 | 6000 | 15.86 | 358 | 2.58 | 250 | 250 | 79 | 13 |
| 7.0 | 7.0 | 28 | 6000 | 16.50 | 387 | 2.51 | 250 | 250 | | |
| 8.0 | 7.0 | 30 | 6000 | 16.18 | 383 | 2.52 | 200 | 200 | 51 | 12 |
| 8.4 | 7.5 | 29 | 6000 | 16.38 | 384 | 2.53 | 200 | 200 | 96 | 11 |
| 8.5 | 7.7 | 30 | 6000 | 15.82 | 377 | 2.51 | 200 | 200 | 84 | 11 |
| 8.9 | 6.8 | 24 | 6000 | 11.25 | 331 | 2.99 | 200 | 200 | | |
| 9.0 | 7.3 | 30 | 6000 | 11.10 | 381 | 2.50 | 200 | 200 | 61 | 13 |
| 9.1 | 6.6 | 24 | 6000 | 11.50 | 329 | 3.00 | 200 | 200 | | |
| 9.2 | 6.6 | 24 | 6000 | 11.35 | 328 | 3.00 | 200 | 200 | 96 | 9 |
| 9.6 | 6.7 | 24 | 6000 | 11.09 | 338 | 3.00 | 200 | 200 | | |

TABLE 4

Stack Quality with 7.0 m3/hr (7000 LPH) Product Flow Rate

| FEED FCE µS/cm | FEED pH | ΔP psi | Product Flow LPH | Product Resistivity Mohms · cm | Voltage Section-1 vdc | Current Section-1 amps |
|---|---|---|---|---|---|---|
| 1.6 | 7.4 | 37 | 7000 | 17.57 | 326 | 1.98 |
| 1.7 | 7.5 | 37 | 7000 | 17.50 | 360 | 2.51 |
| 1.9 | 7.2 | 37 | 7000 | 17.52 | 357 | 2.58 |
| 2.0 | 7.4 | 37 | 7000 | 17.91 | 359 | 2.52 |
| 3.5 | 7.0 | 35 | 7000 | 15.43 | 375 | 2.54 |
| 5.9 | 7.7 | 35 | 7000 | 14.56 | 360 | 2.66 |
| 6.0 | 7.8 | 35 | 7000 | 15.80 | 375 | 2.81 |
| 6.1 | 7.6 | 35 | 7000 | 15.18 | 360 | 2.76 |
| 6.2 | 7.5 | 35 | 7000 | 15.13 | 375 | 2.93 |
| 6.3 | 6.7 | 35 | 7000 | 15.40 | 375 | 2.70 |
| 6.3 | 7.3 | 35 | 7000 | 15.14 | 360 | 2.69 |
| 6.4 | 7.3 | 35 | 7000 | 15.86 | 375 | 2.93 |
| 6.4 | 7.5 | 35 | 7000 | 14.98 | 360 | 2.70 |
| 6.9 | 7.7 | 35 | 7000 | 15.12 | 360 | 2.76 |
| 7.8 | 8.2 | 37 | 7000 | 13.75 | 326 | 2.07 |
| 8.5 | 6.8 | 37 | 7000 | 14.05 | 328 | 2.97 |
| 8.7 | 6.7 | 37 | 7000 | 14.30 | 322 | 3.00 |
| 8.9 | 6.9 | 37 | 7000 | 11.30 | 326 | 2.98 |
| 9.6 | 6.2 | 37 | 7000 | 13.90 | 330 | 2.98 |
| 9.8 | 6.7 | 35 | 7000 | 13.91 | 334 | 2.98 |
| 10.0 | 6.6 | 35 | 7000 | 13.80 | 328 | 2.97 |
| 10.1 | 6.9 | 35 | 7000 | 13.87 | 335 | 2.98 |
| 10.1 | 6.6 | 35 | 7000 | 13.43 | 329 | 2.97 |
| 10.4 | 6.6 | 37 | 7000 | 13.98 | 328 | 2.99 |
| 10.5 | 6.9 | 35 | 7000 | 14.90 | 328 | 3.00 |
| 10.9 | 6.9 | 35 | 7000 | 13.42 | 317 | 3.00 |
| 11.1 | 6.9 | 35 | 7000 | 13.71 | 310 | 3.00 |
| 11.8 | 6.7 | 35 | 7000 | 13.28 | 311 | 3.00 |

| FEED FCE µS/cm | FEED pH | ΔP psi | Product Flow LPH | Product Resistivity Mohms · cm | Voltage Section-2 vdc | Current Section-2 amps | C1(OUT) flow LPH | C2(OUT) flow LPH | Feed Silica ppb | Product Silica ppb |
|---|---|---|---|---|---|---|---|---|---|---|
| 1.6 | 7.4 | 37 | 7000 | 17.57 | 326 | 1.82 | 200 | 200 | 31 | 12 |
| 1.7 | 7.5 | 37 | 7000 | 17.50 | 380 | 2.51 | 200 | 200 | 26 | 7 |
| 1.9 | 7.2 | 37 | 7000 | 17.52 | 370 | 2.52 | 200 | 200 | | |
| 2.0 | 7.4 | 37 | 7000 | 17.91 | 372 | 2.45 | 200 | 200 | | |
| 3.5 | 7.0 | 35 | 7000 | 15.43 | 375 | 2.37 | 200 | 200 | | |
| 5.9 | 7.7 | 35 | 7000 | 14.56 | 360 | 2.43 | 200 | 200 | 50 | 14 |
| 6.0 | 7.8 | 35 | 7000 | 15.80 | 375 | 2.5 | 200 | 200 | 55 | 10 |
| 6.1 | 7.6 | 35 | 7000 | 15.18 | 360 | 2.49 | 200 | 200 | 73 | 12 |
| 6.2 | 7.5 | 35 | 7000 | 15.13 | 375 | 2.6 | 200 | 200 | 50 | 12 |
| 6.3 | 6.7 | 35 | 7000 | 15.40 | 375 | 2.48 | 200 | 200 | 45 | 12 |
| 6.3 | 7.3 | 35 | 7000 | 15.14 | 360 | 2.44 | 200 | 200 | 70 | 11 |

TABLE 4-continued

Stack Quality with 7.0 m3/hr (7000 LPH) Product Flow Rate

| | | | | | | | | | | |
|---|---|---|---|---|---|---|---|---|---|---|
| 6.4 | 7.3 | 35 | 7000 | 15.86 | 375 | 2.6 | 200 | 200 | 50 | 12 |
| 6.4 | 7.5 | 35 | 7000 | 14.98 | 360 | 2.47 | 200 | 200 | 52 | 14 |
| 6.9 | 7.7 | 35 | 7000 | 15.12 | 360 | 2.51 | 200 | 200 | 54 | 15 |
| 7.8 | 8.2 | 37 | 7000 | 13.75 | 326 | 1.88 | 200 | 200 | 50 | 12 |
| 8.5 | 6.8 | 37 | 7000 | 14.05 | 327 | 2.98 | 200 | 200 | 59 | 12 |
| 8.7 | 6.7 | 37 | 7000 | 14.30 | 328 | 3.00 | 200 | 200 | 61 | 8 |
| 8.9 | 6.9 | 37 | 7000 | 11.30 | 326 | 3.00 | 200 | 200 | 82 | 10 |
| 9.6 | 6.2 | 37 | 7000 | 13.90 | 329 | 2.98 | 200 | 200 | 47 | 13 |
| 9.8 | 6.7 | 35 | 7000 | 13.91 | 340 | 2.99 | 200 | 200 | 82 | 8 |
| 10.0 | 6.6 | 35 | 7000 | 13.80 | 331 | 2.98 | 200 | 200 | 34 | 12 |
| 10.1 | 6.9 | 35 | 7000 | 13.87 | 335 | 2.96 | 200 | 200 | 50 | 12 |
| 10.1 | 6.6 | 35 | 7000 | 13.43 | 334 | 3.00 | 200 | 200 | 61 | 11 |
| 10.4 | 6.6 | 37 | 7000 | 13.98 | 331 | 2.99 | 200 | 200 | 36 | 10 |
| 10.5 | 6.9 | 35 | 7000 | 14.90 | 326 | 2.96 | 200 | 200 | 30 | 8 |
| 10.9 | 6.9 | 35 | 7000 | 13.42 | 307 | 3.00 | 200 | 200 | 72 | 13 |
| 11.1 | 6.9 | 35 | 7000 | 13.71 | 291 | 3.00 | 200 | 200 | 48 | 14 |
| 11.8 | 6.7 | 35 | 7000 | 13.28 | 301 | 3.00 | 200 | 200 | | |

Figure 9:
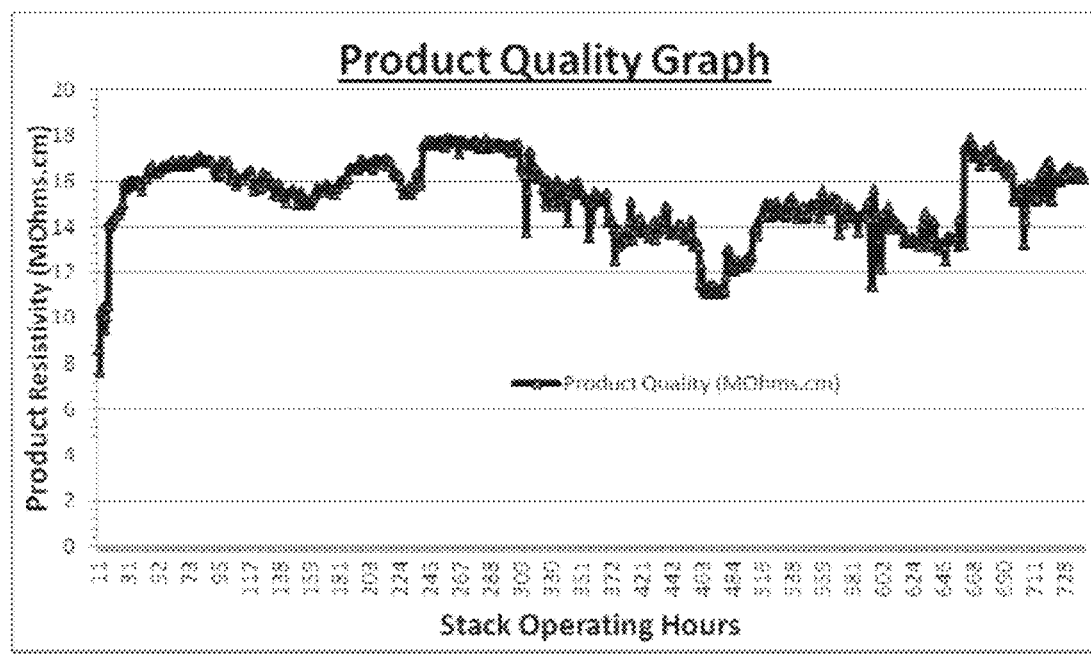
FIG. 9 shows product resistivity for one example of an embodiment of the invention.
Figure 10:
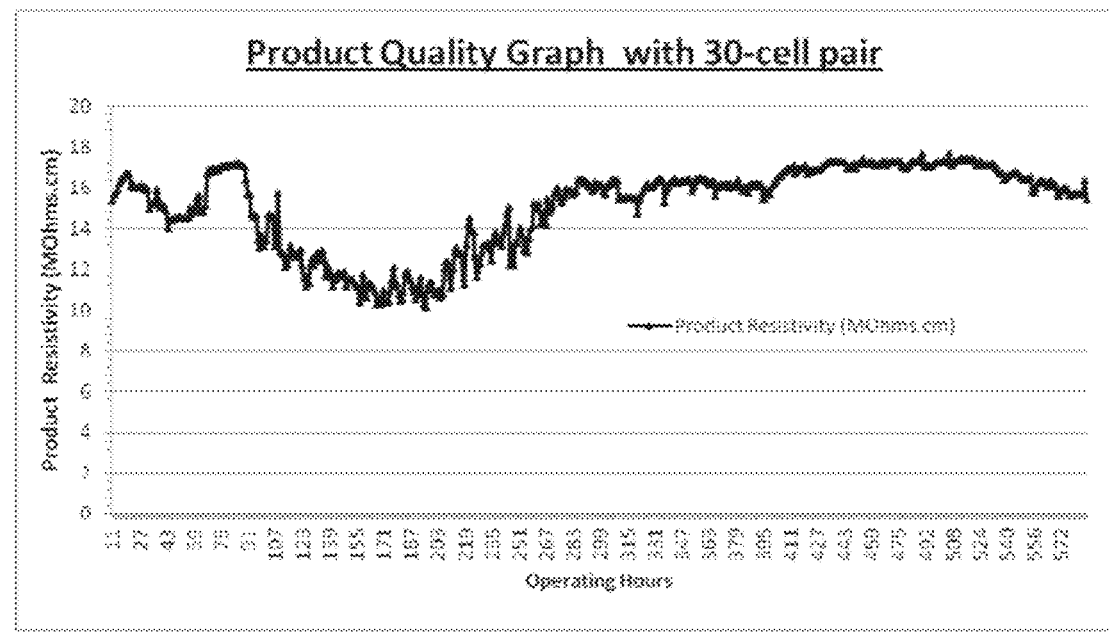
FIG. 10 shows Graph 2, which is a product quality diagram for a 30-cell-pair embodiment of the invention reported in Example 3.
Figure 11:
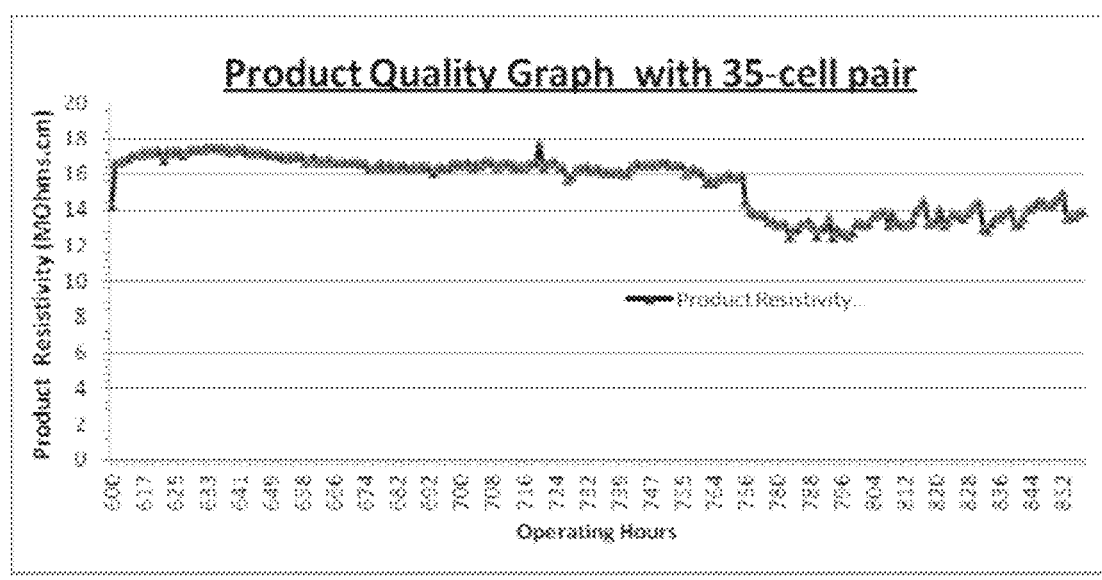
FIG. 11 shows Graph 3, which is a product quality diagram for a 35-cell-pair embodiment of the invention reported in Example 3.

Product Quality Performance:

The new Split Flow EDI apparatus of example-2 was operated for 742 hours with product flow rate of 5.0 m3/hr to 7.0 m3/hr with $2^{nd}$ pass RO permeate water having feed FCE load from 1.0 μS/cm to 10.0 μS/cm. The product resistivity of the apparatus remains above 10 MOhms/c·cm (between 11 MOhms·cm to 17.5 Mohsm·cm) which represent graph 1 (FIG. 9).

Example-3

Another New Split Flow EDI apparatus with new design components was assembled first with 30-cell pairs and tested for 587 hours in 5.0 m3/hr to 7.0 m3/hr product flow rate and then 5 more cell pair added to the apparatus to make it 35-cell pair apparatus and continue the testing up to 857 hours with product flow rate of 6.0 m3/hr to 10.0 m3/hr with $2^{nd}$ pass RO permeate water having less than 10 μS/cm FCE load.

The EDI apparatus configuration of example-3 is

Dilute chambers—30-35 nos with resin media
Concentrate chambers—31-36 nos with conducting mesh.
Electrode chambers—$O_2$ nos.
End plates—$O_2$ number
Electrode: anode—Titanium and Cathode—SS-316
Membrane: Heterogeneous Ion exchange membranes
Effective Membrane area of dilute chamber—4.32 m2 (30-cell pair) to 5.04 m2 (35 cell pair)

The EDI apparatus has been tested for following product flow rate

D—Product flow rate*=5.0 m3/hr (5000 LPH) to 7.0 m3/hr (7000 LPH) (table-5)
E—Product Flow rate*=6.0 m3/hr (6000 LPH) to 10.0 m3/hr (10000 LPH) (table-6)

Note: * Product Flow Rate=(Product-1 flow+product-2 flow)

The EDI apparatus product quality in above product flow conditions is always more than 10 MOhms·cm (generally 10 MOhms/cm to 17.5 MOhms·cm). The applied current is maintained in between 2.0 amps and 3.0 amps in each section (section-1 & 2). The product silica quality is always less 10 ppb from feed silica of 20 ppb to 50 ppb.

The EDI apparatus data of above conditions are summarized in table-5 and table-6.

TABLE 5

(EDI Apparatus data with 30-cell pair; Quality with 5.0 m3/hr to 7.0 m3/hr Product flow rate)

| Stack Op. Hrs. | Feed FCE μS/cm | Feed pH | ΔP psi | Product Flow LPH | Product Resistivity Mohms · cm | Voltage Section-1 Vdc | Current Section-1 Amps |
|---|---|---|---|---|---|---|---|
| 11 | 2.9 | 6.8 | 8 | 6000 | 15.36 | 223 | 2.00 |
| 20 | 3.1 | 7.5 | 8 | 6000 | 16.67 | 227 | 2.01 |
| 30 | 5.6 | 7.5 | 8 | 6000 | 15.90 | 225 | 2.01 |
| 40 | 5.2 | 7.5 | 9 | 6000 | 15.10 | 238 | 2.02 |
| 50 | 4.6 | 7.4 | 9 | 6000 | 14.57 | 248 | 2.01 |
| 60 | 4.4 | 7.5 | 10 | 6000 | 15.10 | 265 | 2.01 |
| 70 | 1.5 | 6.9 | 10 | 6000 | 16.94 | 272 | 2.01 |
| 80 | 1.6 | 6.9 | 10 | 6000 | 17.13 | 261 | 2.00 |
| 90 | 7.0 | 7.4 | 10 | 6000 | 16.41 | 235 | 2.01 |
| 100 | 7.3 | 7.6 | 10 | 6000 | 13.10 | 274 | 2.50 |
| 110 | 7.6 | 7.6 | 10 | 6000 | 12.92 | 280 | 2.53 |
| 120 | 7.0 | 7.5 | 10 | 6000 | 12.58 | 284 | 2.52 |
| 130 | 7.6 | 7.5 | 10 | 6000 | 12.22 | 280 | 2.49 |
| 140 | 7.7 | 7.1 | 10 | 6000 | 11.78 | 284 | 2.50 |
| 150 | 6.6 | 7.0 | 10 | 6000 | 11.44 | 298 | 2.54 |
| 160 | 6.5 | 7.2 | 10 | 6000 | 10.70 | 251 | 2.72 |
| 170 | 7.7 | 7.1 | 10 | 6000 | 10.60 | 257 | 2.77 |
| 180 | 8.3 | 6.9 | 10 | 6000 | 10.76 | 255 | 2.75 |
| 190 | 7.1 | 7.2 | 10 | 6000 | 10.53 | 265 | 2.75 |
| 200 | 7.1 | 7.0 | 7 | 5000 | 10.98 | 270 | 2.75 |
| 210 | 7.8 | 7.2 | 7 | 5000 | 11.61 | 268 | 2.74 |
| 220 | 7.4 | 7.2 | 7 | 5000 | 13.21 | 275 | 2.75 |
| 230 | 7.8 | 7.1 | 7 | 5000 | 13.23 | 272 | 2.75 |

TABLE 5-continued (EDI Apparatus data with 30-cell pair; Quality with 5.0 m3/hr to 7.0 m3/hr Product flow rate)

| | | | | | | | |
|---|---|---|---|---|---|---|---|
| 240 | 7.2 | 7.3 | 7 | 5000 | 13.48 | 284 | 2.75 |
| 250 | 7.6 | 7.2 | 7 | 5000 | 13.25 | 287 | 2.78 |
| 260 | 7.4 | 7.2 | 7 | 5000 | 15.22 | 282 | 2.75 |
| 270 | 7.2 | 7.4 | 7 | 5000 | 14.98 | 282 | 2.75 |
| 280 | 7.4 | 7.2 | 7 | 5000 | 15.81 | 285 | 2.77 |
| 290 | 7.6 | 7.3 | 7 | 5000 | 16.36 | 279 | 2.75 |
| 300 | 7.8 | 7.5 | 7 | 5000 | 16.12 | 283 | 2.75 |
| 310 | 7.4 | 6.8 | 7 | 5000 | 15.45 | 293 | 2.75 |
| 320 | 7.2 | 6.6 | 7 | 5000 | 15.48 | 303 | 2.75 |
| 330 | 7.5 | 7.1 | 7 | 5000 | 16.08 | 292 | 2.75 |
| 340 | 7.5 | 7.6 | 7 | 5000 | 16.18 | 296 | 2.73 |
| 350 | 7.2 | 7.1 | 7 | 5000 | 16.39 | 289 | 2.74 |
| 360 | 7.9 | 7.5 | 7 | 5000 | 16.48 | 286 | 2.75 |
| 370 | 7.9 | 7.4 | 7 | 5000 | 16.10 | 291 | 2.75 |
| 380 | 7.8 | 6.9 | 7 | 5000 | 16.39 | 308 | 2.75 |
| 390 | 6.9 | 6.6 | 7 | 5000 | 16.17 | 303 | 2.75 |
| 400 | 2.6 | 6.5 | 12 | 7000 | 15.97 | 310 | 2.75 |
| 410 | 4.8 | 7.5 | 12 | 7000 | 16.91 | 294 | 2.75 |
| 420 | 2.2 | 7.3 | 12 | 7000 | 17.11 | 284 | 2.75 |
| 430 | 2.2 | 7.0 | 12 | 7000 | 16.99 | 291 | 2.76 |
| 440 | 2.8 | 7.1 | 12 | 7000 | 17.27 | 289 | 2.75 |
| 450 | 2.4 | 6.3 | 12 | 7000 | 16.96 | 288 | 2.76 |
| 460 | 2.5 | 7.3 | 12 | 7000 | 17.19 | 291 | 2.74 |
| 470 | 1.9 | 7.2 | 12 | 7000 | 17.19 | 296 | 2.74 |
| 480 | 2.3 | 6.8 | 12 | 7000 | 16.90 | 296 | 2.75 |
| 490 | 2.1 | 7.2 | 12 | 7000 | 17.67 | 306 | 2.72 |
| 500 | 2.8 | 7.3 | 12 | 7000 | 17.21 | 303 | 2.75 |
| 510 | 2.5 | 6.8 | 12 | 7000 | 17.30 | 308 | 2.75 |
| 520 | 2.2 | 7.0 | 12 | 7000 | 17.36 | 318 | 2.75 |
| 530 | 4.9 | 7.4 | 12 | 7000 | 17.10 | 312 | 2.74 |
| 540 | 5.4 | 7.3 | 12 | 7000 | 16.58 | 316 | 2.75 |
| 550 | 5.1 | 7.2 | 12 | 7000 | 16.33 | 322 | 2.75 |
| 560 | 5.2 | 7.2 | 12 | 7000 | 16.33 | 323 | 2.75 |
| 570 | 5.2 | 7.1 | 12 | 7000 | 15.60 | 325 | 2.73 |
| 580 | 5.8 | 7.5 | 12 | 7000 | 15.71 | 318 | 2.75 |
| 587 | 5.1 | 7.2 | 12 | 7000 | 15.37 | 318 | 2.75 |

| Stack Op. Hrs. | Feed FCE μS/cm | Feed pH | ΔP psi | Product Flow LPH | Product Resistivity Mohms·cm | Voltage Section-2 Vdc | Current Section-2 Amps | C1(OUT) Flow LPH | C2(OUT) Flow LPH | ER Flow LPH | Feed Silica ppb | Product Silica ppb |
|---|---|---|---|---|---|---|---|---|---|---|---|---|
| 11 | 2.9 | 6.8 | 8 | 6000 | 15.36 | 237 | 2.01 | 200 | 200 | 100 | 39 | 5.0 |
| 20 | 3.1 | 7.5 | 8 | 6000 | 16.67 | 247 | 2.01 | 200 | 200 | 80 | 34 | 6.0 |
| 30 | 5.6 | 7.5 | 8 | 6000 | 15.90 | 245 | 2.01 | 200 | 200 | 80 | 34 | 6.0 |
| 40 | 5.2 | 7.5 | 9 | 6000 | 15.10 | 255 | 2.01 | 200 | 200 | 80 | 34 | 6.0 |
| 50 | 4.6 | 7.4 | 9 | 6000 | 14.57 | 272 | 2.00 | 200 | 200 | 80 | 34 | 6.0 |
| 60 | 4.4 | 7.5 | 10 | 6000 | 15.10 | 293 | 2.01 | 200 | 200 | 80 | 32 | 8.0 |
| 70 | 1.5 | 6.9 | 10 | 6000 | 16.94 | 355 | 2.01 | 200 | 200 | 80 | 28 | 9.0 |
| 80 | 1.6 | 6.9 | 10 | 6000 | 17.13 | 358 | 1.99 | 200 | 200 | 80 | 32 | 8.0 |
| 90 | 7.0 | 7.4 | 10 | 6000 | 16.41 | 270 | 2.01 | 200 | 200 | 80 | 27 | 6.0 |
| 100 | 7.3 | 7.6 | 10 | 6000 | 13.10 | 313 | 2.50 | 200 | 200 | 80 | 39 | 7.0 |
| 110 | 7.6 | 7.6 | 10 | 6000 | 12.92 | 335 | 2.54 | 200 | 200 | 80 | 44 | 9.0 |
| 120 | 7.0 | 7.5 | 10 | 6000 | 12.58 | 334 | 2.50 | 200 | 200 | 80 | 44 | 9.0 |
| 130 | 7.6 | 7.5 | 10 | 6000 | 12.22 | 336 | 2.47 | 200 | 200 | 80 | 38 | 8.0 |
| 140 | 7.7 | 7.1 | 10 | 6000 | 11.78 | 360 | 2.52 | 200 | 200 | 80 | 38 | 8.0 |
| 150 | 6.6 | 7.0 | 10 | 6000 | 11.44 | 353 | 2.56 | 200 | 200 | 80 | 38 | 9.0 |
| 160 | 6.5 | 7.2 | 10 | 6000 | 10.70 | 249 | 2.76 | 200 | 200 | 80 | 38 | 9.0 |
| 170 | 7.7 | 7.1 | 10 | 6000 | 10.60 | 247 | 2.74 | 200 | 200 | 80 | 36 | 7.0 |
| 180 | 8.3 | 6.9 | 10 | 6000 | 10.76 | 255 | 2.75 | 200 | 200 | 80 | 40 | 8.0 |
| 190 | 7.1 | 7.2 | 10 | 6000 | 10.53 | 264 | 2.74 | 200 | 200 | 80 | 40 | 8.0 |
| 200 | 7.1 | 7.0 | 7 | 5000 | 10.98 | 264 | 2.74 | 200 | 200 | 80 | 32 | 5.0 |
| 210 | 7.8 | 7.2 | 7 | 5000 | 11.61 | 264 | 2.75 | 200 | 200 | 80 | 38 | 6.0 |
| 220 | 7.4 | 7.2 | 7 | 5000 | 13.21 | 271 | 2.74 | 200 | 200 | 80 | 38 | 6.0 |
| 230 | 7.8 | 7.1 | 7 | 5000 | 13.23 | 270 | 2.75 | 200 | 200 | 80 | 38 | 6.0 |
| 240 | 7.2 | 7.3 | 7 | 5000 | 13.48 | 276 | 2.75 | 200 | 200 | 80 | 42 | 6.0 |
| 250 | 7.6 | 7.2 | 7 | 5000 | 13.25 | 277 | 2.75 | 200 | 200 | 80 | 42 | 6.0 |
| 260 | 7.4 | 7.2 | 7 | 5000 | 15.22 | 276 | 2.75 | 200 | 200 | 80 | 36 | 6.0 |
| 270 | 7.2 | 7.4 | 7 | 5000 | 14.98 | 273 | 2.75 | 200 | 200 | 80 | 24 | 4.0 |
| 280 | 7.4 | 7.2 | 7 | 5000 | 15.81 | 274 | 2.73 | 200 | 200 | 80 | 24 | 4.0 |
| 290 | 7.6 | 7.3 | 7 | 5000 | 16.36 | 270 | 2.75 | 200 | 200 | 80 | 24 | 4.0 |
| 300 | 7.8 | 7.5 | 7 | 5000 | 16.12 | 275 | 2.75 | 200 | 200 | 80 | 24 | 4.0 |
| 310 | 7.4 | 6.8 | 7 | 5000 | 15.45 | 286 | 2.75 | 200 | 200 | 80 | 24 | 4.0 |
| 320 | 7.2 | 6.6 | 7 | 5000 | 15.48 | 294 | 2.75 | 200 | 200 | 80 | 24 | 4.0 |
| 330 | 7.5 | 7.1 | 7 | 5000 | 16.08 | 286 | 2.74 | 200 | 200 | 80 | 36 | 4.0 |
| 340 | 7.5 | 7.6 | 7 | 5000 | 16.18 | 287 | 2.74 | 200 | 200 | 80 | 36 | 4.0 |
| 350 | 7.2 | 7.1 | 7 | 5000 | 16.39 | 281 | 2.75 | 200 | 200 | 80 | 29 | 3.0 |
| 360 | 7.9 | 7.5 | 7 | 5000 | 16.48 | 277 | 2.75 | 200 | 200 | 80 | 38 | 5.0 |
| 370 | 7.9 | 7.4 | 7 | 5000 | 16.10 | 277 | 2.75 | 200 | 200 | 80 | 38 | 5.0 |

TABLE 5-continued (EDI Apparatus data with 30-cell pair; Quality with 5.0 m3/hr to 7.0 m3/hr Product flow rate)

| 380 | 7.8 | 6.9 | 7  | 5000 | 16.39 | 294 | 2.75 | 200 | 200 | 80 |      |     |
| 390 | 6.9 | 6.6 | 7  | 5000 | 16.17 | 293 | 2.75 | 200 | 200 | 80 | 49.6 | 3.4 |
| 400 | 2.6 | 6.5 | 12 | 7000 | 15.97 | 301 | 2.75 | 200 | 200 | 80 | 59.7 | 6.6 |
| 410 | 4.8 | 7.5 | 12 | 7000 | 16.91 | 284 | 2.75 | 200 | 200 | 80 | 28.1 | 4.1 |
| 420 | 2.2 | 7.3 | 12 | 7000 | 17.11 | 274 | 2.75 | 200 | 200 | 80 | 19.3 | 4.1 |
| 430 | 2.2 | 7.0 | 12 | 7000 | 16.99 | 271 | 2.77 | 200 | 200 | 80 | 19.3 | 4.1 |
| 440 | 2.8 | 7.1 | 12 | 7000 | 17.27 | 275 | 2.74 | 200 | 200 | 80 | 30.1 | 4.0 |
| 450 | 2.4 | 6.3 | 12 | 7000 | 16.96 | 273 | 2.75 | 200 | 200 | 80 | 15.1 | 3.4 |
| 460 | 2.5 | 7.3 | 12 | 7000 | 17.19 | 276 | 2.74 | 200 | 200 | 80 | 25.4 | 3.0 |
| 470 | 1.9 | 7.2 | 12 | 7000 | 17.19 | 280 | 2.74 | 200 | 200 | 80 | 15.1 | 3.4 |
| 480 | 2.3 | 6.8 | 12 | 7000 | 16.90 | 276 | 2.76 | 200 | 200 | 80 | 19.9 | 2.6 |
| 490 | 2.1 | 7.2 | 12 | 7000 | 17.67 | 291 | 2.72 | 200 | 200 | 80 | 26.7 | 3.9 |
| 500 | 2.8 | 7.3 | 12 | 7000 | 17.21 | 287 | 2.74 | 200 | 200 | 80 | 28.8 | 2.0 |
| 510 | 2.5 | 6.8 | 12 | 7000 | 17.30 | 290 | 2.74 | 200 | 200 | 80 | 56.0 | 5.4 |
| 520 | 2.2 | 7.0 | 12 | 7000 | 17.36 | 294 | 2.74 | 200 | 200 | 80 | 32.0 | 3.5 |
| 530 | 4.9 | 7.4 | 12 | 7000 | 17.10 | 294 | 2.74 | 200 | 200 | 80 | 32.0 | 3.5 |
| 540 | 5.4 | 7.3 | 12 | 7000 | 16.58 | 299 | 2.76 | 200 | 200 | 80 | 30.0 | 5.3 |
| 550 | 5.1 | 7.2 | 12 | 7000 | 16.33 | 305 | 2.75 | 200 | 200 | 80 | 56.0 | 5.0 |
| 560 | 5.2 | 7.2 | 12 | 7000 | 16.33 | 309 | 2.75 | 200 | 200 | 80 | 56.0 | 5.0 |
| 570 | 5.2 | 7.1 | 12 | 7000 | 15.60 | 309 | 2.75 | 200 | 200 | 80 | 32.0 | 3.5 |
| 580 | 5.8 | 7.5 | 12 | 7000 | 15.71 | 306 | 2.75 | 200 | 200 | 80 | 32.0 | 3.5 |
| 587 | 5.1 | 7.2 | 12 | 7000 | 15.37 | 300 | 2.77 | 200 | 200 | 80 | 28.2 | 5.4 |

TABLE 6

(EDI Apparatus Data with 35-cell pair; Product flow rate = 6.0 m3/hr to 10.0 m3/hr)

| Stack Op. Hrs. | Feed FCE µS/cm | Feed pH | ΔP psi | Product Flow LPH | Product Resistivity Mohms·cm | Voltage Section-1 Vdc | Current Section-1 Amps |
|---|---|---|---|---|---|---|---|
| 600 | 2.6 | 6.3 | 13 | 6000  | 14.22 | 363 | 2.53 |
| 610 | 6.9 | 7.0 | 13 | 8000  | 16.67 | 339 | 2.52 |
| 620 | 4.9 | 7.3 | 13 | 8000  | 17.29 | 340 | 2.53 |
| 630 | 4.9 | 7.3 | 13 | 8000  | 17.37 | 344 | 2.54 |
| 640 | 4.5 | 7.0 | 13 | 8000  | 17.37 | 346 | 2.55 |
| 651 | 5.7 | 7.0 | 13 | 8000  | 17.04 | 337 | 2.56 |
| 660 | 5.9 | 7.3 | 13 | 8000  | 16.86 | 346 | 2.55 |
| 670 | 6.4 | 7.1 | 13 | 8000  | 16.63 | 349 | 2.52 |
| 680 | 7.0 | 7.6 | 13 | 8000  | 16.50 | 353 | 2.53 |
| 690 | 7.2 | 7.3 | 13 | 8000  | 16.44 | 365 | 2.54 |
| 700 | 6.8 | 7.3 | 16 | 9000  | 16.54 | 369 | 2.52 |
| 710 | 6.9 | 7.5 | 17 | 9000  | 16.52 | 370 | 2.53 |
| 720 | 6.2 | 7.3 | 17 | 9000  | 17.72 | 365 | 2.52 |
| 730 | 6.7 | 7.4 | 7  | 6000  | 16.32 | 380 | 2.53 |
| 740 | 6.9 | 7.4 | 7  | 6000  | 16.00 | 380 | 2.52 |
| 750 | 6.7 | 7.4 | 7  | 6000  | 16.65 | 343 | 2.02 |
| 760 | 6.8 | 7.4 | 7  | 6000  | 16.10 | 348 | 2.01 |
| 770 | 6.5 | 7.3 | 20 | 10000 | 15.86 | 343 | 2.02 |
| 780 | 6.7 | 7.1 | 18 | 10000 | 13.10 | 335 | 2.02 |
| 790 | 6.8 | 7.3 | 18 | 10000 | 12.54 | 430 | 2.54 |
| 800 | 6.3 | 7.1 | 18 | 10000 | 13.25 | 412 | 2.52 |
| 810 | 6.3 | 7.2 | 20 | 10000 | 13.30 | 405 | 2.52 |
| 820 | 6.6 | 7.4 | 20 | 10000 | 13.39 | 416 | 2.53 |
| 830 | 5.1 | 7.3 | 20 | 10000 | 14.32 | 409 | 2.54 |
| 840 | 5.6 | 7.3 | 20 | 10000 | 13.11 | 408 | 2.53 |
| 850 | 5.6 | 7.6 | 20 | 10000 | 14.52 | 409 | 2.53 |
| 857 | 5.5 | 7.3 | 20 | 10000 | 13.87 | 400 | 2.52 |

| Stack Op. Hrs. | Feed FCE µS/cm | Feed pH | ΔP psi | Product Flow LPH | Product Resistivity Mohms·cm | Voltage Section-2 Vdc | Current Section-2 Amps | C1(OUT) Flow LPH | C2(OUT) Flow LPH | ER Flow LPH | Feed Silica ppb | Product Silica ppb |
|---|---|---|---|---|---|---|---|---|---|---|---|---|
| 600 | 2.6 | 6.3 | 13 | 6000 | 14.22 | 368 | 2.57 | 230 | 230 | 80 | 28.8 | 6.1 |
| 610 | 6.9 | 7.0 | 13 | 8000 | 16.67 | 352 | 2.56 | 250 | 250 | 80 | 38.5 | 4.7 |
| 620 | 4.9 | 7.3 | 13 | 8000 | 17.29 | 377 | 2.54 | 250 | 250 | 80 | 38.5 | 4.7 |
| 630 | 4.9 | 7.3 | 13 | 8000 | 17.37 | 409 | 2.53 | 250 | 250 | 80 | 28.2 | 5.4 |
| 640 | 4.5 | 7.0 | 13 | 8000 | 17.37 | 427 | 2.54 | 250 | 250 | 80 | 32.0 | 3.5 |
| 651 | 5.7 | 7.0 | 13 | 8000 | 17.04 | 402 | 2.56 | 250 | 250 | 80 | 38.5 | 4.7 |
| 660 | 5.9 | 7.3 | 13 | 8000 | 16.86 | 428 | 2.52 | 250 | 250 | 80 | 37.2 | 4.8 |
| 670 | 6.4 | 7.1 | 13 | 8000 | 16.63 | 418 | 2.53 | 250 | 250 | 80 | 38.3 | 3.3 |
| 680 | 7.0 | 7.6 | 13 | 8000 | 16.50 | 408 | 2.53 | 250 | 250 | 80 | 36.5 | 6.1 |
| 690 | 7.2 | 7.3 | 13 | 8000 | 16.44 | 422 | 2.51 | 250 | 250 | 80 | 36.4 | 6.1 |
| 700 | 6.8 | 7.3 | 16 | 9000 | 16.54 | 433 | 2.53 | 250 | 250 | 80 | 36.4 | 6.1 |
| 710 | 6.9 | 7.5 | 17 | 9000 | 16.52 | 445 | 2.54 | 250 | 250 | 80 | 37.1 | 6.7 |

TABLE 6-continued (EDI Apparatus Data with 35-cell pair; Product flow rate = 6.0 m3/hr to 10.0 m3/hr)

| | | | | | | | | | | | | |
|---|---|---|---|---|---|---|---|---|---|---|---|---|
| 720 | 6.2 | 7.3 | 17 | 9000 | 17.72 | 438 | 2.55 | 250 | 250 | 80 | 36.4 | 6.1 |
| 730 | 6.7 | 7.4 | 7 | 6000 | 16.32 | 467 | 2.54 | 250 | 250 | 80 | 37.1 | 6.7 |
| 740 | 6.9 | 7.4 | 7 | 6000 | 16.00 | 432 | 2.50 | 250 | 250 | 80 | 30.8 | 4.6 |
| 750 | 6.7 | 7.4 | 7 | 6000 | 16.65 | 402 | 2.02 | 250 | 250 | 80 | 30.9 | 6.0 |
| 760 | 6.8 | 7.4 | 7 | 6000 | 16.10 | 404 | 2.01 | 250 | 250 | 80 | 17.2 | 2.6 |
| 770 | 6.5 | 7.3 | 20 | 10000 | 15.86 | 394 | 2.01 | 250 | 250 | 80 | | |
| 780 | 6.7 | 7.1 | 18 | 10000 | 13.10 | 380 | 2.02 | 250 | 250 | 80 | 33.0 | 6.8 |
| 790 | 6.8 | 7.3 | 18 | 10000 | 12.54 | 496 | 2.47 | 250 | 250 | 80 | 31.5 | 8.7 |
| 800 | 6.3 | 7.1 | 18 | 10000 | 13.25 | 480 | 2.52 | 250 | 250 | 80 | 31.5 | 8.7 |
| 810 | 6.3 | 7.2 | 20 | 10000 | 13.30 | 471 | 2.56 | 250 | 250 | 80 | 19.9 | 5.3 |
| 820 | 6.6 | 7.4 | 20 | 10000 | 13.39 | 488 | 2.55 | 250 | 250 | 80 | 20.6 | 4.0 |
| 830 | 5.1 | 7.3 | 20 | 10000 | 14.32 | 492 | 2.51 | 250 | 250 | 80 | 19.9 | 5.3 |
| 840 | 5.6 | 7.3 | 20 | 10000 | 13.11 | 484 | 2.53 | 250 | 250 | 80 | 31.5 | 6.7 |
| 850 | 5.6 | 7.6 | 20 | 10000 | 14.52 | 497 | 2.51 | 250 | 250 | 80 | 19.9 | 5.3 |
| 857 | 5.5 | 7.3 | 20 | 10000 | 13.87 | 478 | 2.5 | 250 | 250 | 80 | 19.9 | 5.3 |

Example-4

One trial was conducted to check the Flexibility of new EDI apparatus for treating $1^{st}$ pass RO permeate water with FCE load greater than 10 µS/cm. For this one 30-cell pair stack was assembled similar to example-2 EDI apparatus and tested with $1^{st}$ pass RO permeate water for 1010 Hours. The feed RO permeate water specification are as follows Conductivity=15-20 µS/cm
pH=6.0-6.5
Total Hardness=0.5-1.5 ppm as CaCO3
Silica=200-400 ppb as SiO2
CO2=1-3 ppm The product flow rate was maintained 3.0 m3/hr (3000 LPH) throughout the experiment with pressure drop of 24-26 psi. The Resistivity of product water was achieved between 15 Mohms·cm and 17 Mohms·cm with product silica level of less than 15 ppb. The data of the experiment are summarized in table-7

TABLE 7

(EDI Apparatus data with $1^{st}$ pass RO permeate water with Product flow rate of 3.0 m3/hr (3000 LPH))

| Op. Hrs. | Feed Cond. µS/cm | Feed pH | ΔP psi | Product Flow LPH | Product Resistivity Mohms · cm | Voltage Section-1 Vdc | Current Section-1 amps | Voltage Section-2 Vdc | Current Section-2 amps |
|---|---|---|---|---|---|---|---|---|---|
| 1 | 20.0 | 6.0 | 26 | 3000 | 16.74 | 169 | 1.1 | 195 | 1.5 |
| 10 | 18.6 | 6.3 | 26 | 3000 | 16.85 | 175 | 1.1 | 194 | 1.5 |
| 20 | 19.6 | 6.6 | 26 | 3000 | 16.54 | 175 | 1.1 | 192 | 1.5 |
| 30 | 19.6 | 6.5 | 26 | 3000 | 16.44 | 180 | 1.1 | 196 | 1.5 |
| 40 | 19.7 | 6.2 | 26 | 3000 | 16.66 | 185 | 1.1 | 237 | 2.0 |
| 50 | 20.2 | 6.2 | 26 | 3000 | 16.94 | 183 | 1.1 | 238 | 2.0 |
| 60 | 19.6 | 6.6 | 26 | 3000 | 16.92 | 191 | 1.1 | 247 | 2.0 |
| 70 | 19.0 | 6.0 | 26 | 3000 | 17.29 | 184 | 1.1 | 242 | 2.0 |
| 80 | 19.9 | 6.2 | 26 | 3000 | 16.98 | 185 | 1.1 | 247 | 2.0 |
| 90 | 19.6 | 6.7 | 26 | 3000 | 16.89 | 190 | 1.1 | 256 | 2.0 |
| 100 | 19.4 | 6.3 | 26 | 3000 | 17.09 | 185 | 1.1 | 245 | 2.0 |
| 110 | 19.6 | 6.3 | 26 | 3000 | 16.64 | 185 | 1.1 | 249 | 2.0 |
| 120 | 20.1 | 6.2 | 26 | 3000 | 16.38 | 185 | 1.1 | 245 | 2.0 |
| 130 | 19.3 | 6.3 | 26 | 3000 | 16.74 | 187 | 1.1 | 247 | 2.0 |
| 140 | 19.4 | 6.1 | 26 | 3000 | 16.97 | 182 | 1.1 | 240 | 2.0 |
| 150 | 19.3 | 6.4 | 26 | 3000 | 16.76 | 190 | 1.1 | 252 | 2.0 |
| 160 | 20.6 | 6.3 | 26 | 3000 | 16.57 | 193 | 1.1 | 250 | 2.0 |
| 170 | 19.0 | 6.3 | 24 | 3000 | 16.91 | 187 | 1.1 | 247 | 2.0 |
| 180 | 19.3 | 6.3 | 26 | 3000 | 17.09 | 182 | 1.1 | 240 | 2.0 |
| 190 | 19.5 | 6.4 | 26 | 3000 | 16.78 | 190 | 1.1 | 252 | 2.0 |
| 200 | 19.4 | 6.5 | 26 | 3000 | 16.84 | 193 | 1.1 | 250 | 2.0 |
| 210 | 19.3 | 6.6 | 26 | 3000 | 16.85 | 182 | 1.1 | 240 | 2.0 |
| 220 | 20.1 | 6.3 | 26 | 3000 | 16.76 | 190 | 1.1 | 252 | 2.0 |
| 230 | 19.0 | 6.3 | 26 | 3000 | 16.86 | 183 | 1.1 | 238 | 2.0 |
| 240 | 19.1 | 6.2 | 26 | 3000 | 16.70 | 190 | 1.1 | 246 | 2.0 |
| 250 | 19.0 | 6.5 | 26 | 3000 | 16.85 | 201 | 1.1 | 246 | 2.0 |
| 260 | 19.4 | 6.2 | 24 | 3000 | 16.36 | 191 | 1.1 | 247 | 2.0 |
| 270 | 19.8 | 6.3 | 24 | 3000 | 16.07 | 184 | 1.1 | 242 | 2.0 |
| 280 | 20.1 | 6.3 | 26 | 3000 | 16.19 | 185 | 1.1 | 247 | 2.0 |
| 290 | 20.6 | 6.1 | 26 | 3000 | 16.31 | 183 | 1.1 | 238 | 2.0 |
| 300 | 20.3 | 6.3 | 26 | 3000 | 16.38 | 190 | 1.1 | 246 | 2.0 |
| 310 | 20.9 | 6.4 | 24 | 3000 | 16.20 | 195 | 1.1 | 246 | 2.0 |
| 320 | 20.4 | 6.2 | 24 | 3000 | 16.61 | 191 | 1.1 | 247 | 2.0 |
| 330 | 19.9 | 6.3 | 24 | 3000 | 16.50 | 184 | 1.1 | 242 | 2.0 |
| 340 | 20.7 | 6.3 | 24 | 3000 | 16.31 | 185 | 1.1 | 247 | 2.0 |
| 350 | 19.7 | 6.7 | 24 | 3000 | 16.19 | 190 | 1.1 | 256 | 2.0 |
| 360 | 20.4 | 6.0 | 24 | 3000 | 16.20 | 185 | 1.1 | 245 | 2.0 |
| 370 | 19.8 | 6.5 | 24 | 3000 | 16.09 | 185 | 1.1 | 249 | 2.0 |
| 380 | 20.4 | 6.4 | 24 | 3000 | 16.10 | 185 | 1.1 | 245 | 2.0 |

TABLE 7-continued (EDI Apparatus data with 1st pass RO permeate water with Product flow rate of 3.0 m3/hr (3000 LPH))

| 390 | 20.5 | 6.2 | 24 | 3000 | 16.09 | 187 | 1.1 | 247 | 2.0 |
| 400 | 19.5 | 6.6 | 24 | 3000 | 16.10 | 182 | 1.1 | 240 | 2.0 |
| 410 | 20.7 | 6.6 | 24 | 3000 | 15.76 | 190 | 1.1 | 252 | 2.0 |
| 420 | 19.6 | 6.7 | 24 | 3000 | 16.05 | 193 | 1.1 | 250 | 2.0 |
| 430 | 20.3 | 6.4 | 24 | 3000 | 15.61 | 200 | 1.2 | 250 | 2.0 |
| 440 | 20.2 | 6.5 | 24 | 3000 | 15.72 | 201 | 1.2 | 251 | 2.0 |
| 450 | 20.8 | 6.3 | 24 | 3000 | 16.10 | 207 | 1.2 | 245 | 2.0 |
| 460 | 18.4 | 6.5 | 24 | 3000 | 16.21 | 205 | 1.2 | 245 | 2.0 |
| 470 | 18.0 | 6.6 | 24 | 3000 | 16.46 | 200 | 1.2 | 233 | 2.0 |
| 480 | 18.5 | 6.4 | 24 | 3000 | 16.10 | 210 | 1.2 | 237 | 2.0 |
| 490 | 18.6 | 6.2 | 24 | 3000 | 16.09 | 209 | 1.2 | 245 | 2.0 |
| 500 | 18.5 | 6.5 | 24 | 3000 | 15.85 | 200 | 1.2 | 243 | 2.0 |
| 510 | 18.6 | 6.2 | 24 | 3000 | 15.78 | 206 | 1.2 | 250 | 2.0 |
| 520 | 18.6 | 6.6 | 24 | 3000 | 15.67 | 203 | 1.2 | 244 | 2.0 |
| 530 | 19.0 | 6.4 | 24 | 3000 | 15.26 | 208 | 1.2 | 249 | 2.0 |
| 540 | 18.0 | 6.5 | 24 | 3000 | 14.97 | 210 | 1.2 | 251 | 2.0 |
| 550 | 14.1 | 6.4 | 24 | 3000 | 15.87 | 221 | 1.5 | 263 | 2.3 |
| 560 | 15.8 | 6.4 | 24 | 3000 | 15.60 | 215 | 1.5 | 261 | 2.3 |
| 570 | 16.1 | 6.4 | 24 | 3000 | 16.80 | 198 | 1.2 | 246 | 2.1 |
| 580 | 16.8 | 6.4 | 24 | 3000 | 16.57 | 206 | 1.2 | 260 | 2.2 |
| 590 | 15.2 | 6.6 | 24 | 3000 | 16.48 | 204 | 1.2 | 269 | 2.2 |
| 600 | 15.4 | 6.3 | 24 | 3000 | 16.34 | 200 | 1.2 | 270 | 2.2 |
| 610 | 15.2 | 6.4 | 24 | 3000 | 16.09 | 197 | 1.2 | 266 | 2.2 |
| 620 | 15.5 | 6.4 | 26 | 3000 | 16.08 | 198 | 1.2 | 268 | 2.2 |
| 630 | 15.9 | 6.4 | 26 | 3000 | 15.88 | 202 | 1.2 | 272 | 2.2 |
| 640 | 16.4 | 6.3 | 26 | 3000 | 15.80 | 202 | 1.2 | 268 | 2.2 |
| 650 | 16.5 | 6.3 | 26 | 3000 | 15.78 | 225 | 1.4 | 276 | 2.3 |
| 660 | 15.0 | 6.5 | 26 | 3000 | 15.92 | 213 | 1.3 | 276 | 2.3 |
| 670 | 15.6 | 6.5 | 26 | 3000 | 15.92 | 214 | 1.3 | 278 | 2.3 |
| 680 | 15.3 | 6.5 | 26 | 3000 | 16.03 | 223 | 1.3 | 287 | 2.3 |
| 690 | 16.1 | 6.5 | 26 | 3000 | 16.16 | 218 | 1.3 | 282 | 2.3 |
| 700 | 16.0 | 6.4 | 26 | 3000 | 16.17 | 217 | 1.3 | 286 | 2.3 |
| 710 | 18.0 | 6.5 | 26 | 3000 | 16.53 | 219 | 1.3 | 268 | 2.3 |
| 720 | 17.9 | 6.5 | 26 | 3000 | 16.25 | 222 | 1.3 | 284 | 2.3 |
| 730 | 17.0 | 6.5 | 26 | 3000 | 15.91 | 225 | 1.3 | 288 | 2.3 |
| 740 | 16.9 | 6.5 | 26 | 3000 | 15.66 | 222 | 1.3 | 284 | 2.3 |
| 750 | 16.7 | 6.2 | 26 | 3000 | 15.60 | 234 | 1.3 | 292 | 2.3 |
| 760 | 18.2 | 6.3 | 26 | 3000 | 16.36 | 233 | 1.3 | 284 | 2.3 |
| 770 | 17.6 | 6.5 | 26 | 3000 | 15.95 | 233 | 1.3 | 285 | 2.3 |
| 780 | 18.8 | 6.0 | 26 | 3000 | 15.58 | 250 | 1.4 | 282 | 2.3 |
| 790 | 18.5 | 6.0 | 26 | 3000 | 15.52 | 244 | 1.4 | 287 | 2.3 |
| 800 | 18.5 | 6.1 | 26 | 3000 | 16.25 | 245 | 1.4 | 266 | 2.3 |
| 810 | 18.5 | 6.1 | 26 | 3000 | 16.25 | 250 | 1.4 | 282 | 2.3 |
| 820 | 18.6 | 6.1 | 26 | 3000 | 15.85 | 254 | 1.4 | 289 | 2.3 |
| 830 | 18.4 | 6.1 | 26 | 3000 | 15.52 | 258 | 1.4 | 287 | 2.3 |
| 840 | 18.9 | 6.0 | 26 | 3000 | 15.56 | 264 | 1.4 | 292 | 2.3 |
| 850 | 18.0 | 6.2 | 26 | 3000 | 15.53 | 266 | 1.4 | 293 | 2.3 |
| 860 | 18.4 | 6.1 | 26 | 3000 | 15.21 | 268 | 1.4 | 288 | 2.3 |
| 870 | 18.2 | 6.1 | 26 | 3000 | 14.91 | 267 | 1.4 | 304 | 2.5 |
| 880 | 18.5 | 6.1 | 26 | 3000 | 15.25 | 275 | 1.4 | 310 | 2.5 |
| 890 | 18.5 | 6.2 | 26 | 3000 | 15.16 | 293 | 1.4 | 325 | 2.5 |
| 900 | 18.4 | 6.2 | 26 | 3000 | 15.01 | 294 | 1.4 | 316 | 2.5 |
| 910 | 18.6 | 6.2 | 26 | 3000 | 14.74 | 294 | 1.4 | 320 | 2.5 |
| 920 | 18.4 | 6.5 | 26 | 3000 | 14.85 | 305 | 1.4 | 317 | 2.5 |
| 930 | 18.4 | 6.4 | 26 | 3000 | 14.81 | 310 | 1.4 | 324 | 2.5 |
| 940 | 18.7 | 6.6 | 26 | 3000 | 15.40 | 276 | 1.4 | 298 | 2.5 |
| 950 | 18.9 | 6.5 | 26 | 3000 | 15.53 | 294 | 1.4 | 310 | 2.5 |
| 960 | 18.7 | 6.5 | 26 | 3000 | 15.15 | 292 | 1.4 | 324 | 2.5 |
| 970 | 18.6 | 5.9 | 26 | 3000 | 15.31 | 308 | 1.4 | 328 | 2.5 |
| 980 | 18.7 | 6.4 | 24 | 3000 | 15.38 | 322 | 1.4 | 336 | 2.5 |
| 990 | 18.1 | 6.5 | 24 | 3000 | 15.38 | 330 | 1.4 | 347 | 2.5 |
| 1000 | 18.3 | 6.3 | 24 | 3000 | 15.42 | 327 | 1.4 | 343 | 2.5 |
| 1010 | 18.3 | 6.3 | 24 | 3000 | 15.68 | 347 | 1.4 | 351 | 2.5 |

| Op. Hrs. | Feed Cond. µS/cm | Feed pH | ΔP psi | Product Flow LPH | Product Resistivity Mohms·cm | C1(OUT) Flow LPH | C1(OUT) pH | C2OUT Flow LPH | C2OUT pH | E.Rinse Flow LPH | Feed Silica ppb | Product Silica ppb | Feed TH ppm |
|---|---|---|---|---|---|---|---|---|---|---|---|---|---|
| 1 | 20.0 | 6.0 | 26 | 3000 | 16.74 | 200 | 9.5 | 200 | 9.2 | 80 | 226 | 6 | 0.1 |
| 10 | 18.6 | 6.3 | 26 | 3000 | 16.85 | 200 | 3.6 | 200 | 9.5 | 80 | | | |
| 20 | 19.6 | 6.6 | 26 | 3000 | 16.54 | 200 | 3.6 | 200 | 7.7 | 80 | 231 | 8 | |
| 30 | 19.6 | 6.5 | 26 | 3000 | 16.44 | 200 | 5.0 | 200 | 4.9 | 80 | 222 | 7 | |
| 40 | 19.7 | 6.2 | 26 | 3000 | 16.66 | 200 | 9.3 | 200 | 9.2 | 80 | 224 | 7 | 0.1 |
| 50 | 20.2 | 6.2 | 26 | 3000 | 16.94 | 200 | 5.9 | 200 | 8.1 | 80 | 244 | 8 | |
| 60 | 19.6 | 6.6 | 26 | 3000 | 16.92 | 200 | 8.1 | 200 | 8.0 | 80 | 238 | 8 | |
| 70 | 19.0 | 6.0 | 26 | 3000 | 17.29 | 200 | 9.4 | 200 | 8.1 | 80 | | | |
| 80 | 19.9 | 6.2 | 26 | 3000 | 16.98 | 200 | 6.8 | 200 | 9.2 | 80 | 205 | 9 | |

TABLE 7-continued (EDI Apparatus data with 1st pass RO permeate water with Product flow rate of 3.0 m3/hr (3000 LPH))

| | | | | | | | | | | | | |
|---|---|---|---|---|---|---|---|---|---|---|---|---|
| 90 | 19.6 | 6.7 | 26 | 3000 | 16.89 | 200 | 7.6 | 200 | 7.7 | 80 | 438 | 10 | 0.2 |
| 100 | 19.4 | 6.3 | 26 | 3000 | 17.09 | 200 | 9.5 | 200 | 8.7 | 80 | 397 | 11 | |
| 110 | 19.6 | 6.3 | 26 | 3000 | 16.64 | 200 | 8.7 | 200 | 9.1 | 80 | 385 | 11 | |
| 120 | 20.1 | 6.2 | 26 | 3000 | 16.38 | 200 | 8.4 | 200 | 9.3 | 80 | 393 | 10 | |
| 130 | 19.3 | 6.3 | 26 | 3000 | 16.74 | 200 | 8.7 | 200 | 8.9 | 80 | 385 | 11 | |
| 140 | 19.4 | 6.1 | 26 | 3000 | 16.97 | 200 | 8.7 | 200 | 8.6 | 80 | 404 | 14 | |
| 150 | 19.3 | 6.4 | 26 | 3000 | 16.76 | 200 | 7.8 | 200 | 9.2 | 80 | 365 | 14 | 0.3 |
| 160 | 20.6 | 6.3 | 26 | 3000 | 16.57 | 200 | 10.3 | 200 | 9.7 | 80 | 362 | 14 | |
| 170 | 19.0 | 6.3 | 24 | 3000 | 16.91 | 200 | 7.5 | 200 | 9.2 | 80 | 358 | 13 | |
| 180 | 19.3 | 6.3 | 26 | 3000 | 17.09 | 200 | 8.7 | 200 | 7.8 | 80 | 418 | 13 | |
| 190 | 19.5 | 6.4 | 26 | 3000 | 16.78 | 200 | 8.6 | 200 | 9.3 | 80 | 409 | 13 | |
| 200 | 19.4 | 6.5 | 26 | 3000 | 16.84 | 200 | 8.2 | 200 | 9.3 | 80 | 344 | 12 | |
| 210 | 19.3 | 6.6 | 26 | 3000 | 16.85 | 200 | 8.6 | 200 | 8.9 | 80 | 391 | 14 | |
| 220 | 20.1 | 6.3 | 26 | 3000 | 16.76 | 200 | 8.2 | 200 | 9.3 | 80 | | | |
| 230 | 19.0 | 6.3 | 26 | 3000 | 16.86 | 200 | 9.3 | 200 | 8.8 | 80 | 163 | 13 | 0.5 |
| 240 | 19.1 | 6.2 | 26 | 3000 | 16.70 | 200 | 9.2 | 200 | 9.6 | 80 | | | |
| 250 | 19.0 | 6.5 | 26 | 3000 | 16.85 | 200 | 5.7 | 200 | 10 | 80 | | | |
| 260 | 19.4 | 6.2 | 24 | 3000 | 16.36 | 220 | 5.6 | 200 | 9.2 | 80 | 201 | 13 | 0.6 |
| 270 | 19.8 | 6.3 | 24 | 3000 | 16.07 | 220 | 4.5 | 200 | 9.3 | 80 | 207 | 14 | 0.6 |
| 280 | 20.1 | 6.3 | 24 | 3000 | 16.19 | 220 | 5.7 | 200 | 9.6 | 80 | 201 | 13 | 0.6 |
| 290 | 20.6 | 6.1 | 26 | 3000 | 16.31 | 220 | 3.9 | 200 | 9.5 | 80 | 203 | 14 | 0.6 |
| 300 | 20.3 | 6.3 | 26 | 3000 | 16.38 | 220 | 9.3 | 200 | 10.0 | 80 | 196 | 11 | 0.7 |
| 310 | 20.9 | 6.4 | 24 | 3000 | 16.20 | 220 | 3.7 | 200 | 9.9 | 80 | 235 | 11 | 0.7 |
| 320 | 20.4 | 6.2 | 24 | 3000 | 16.61 | 220 | 3.8 | 200 | 9.9 | 80 | 221 | 11 | 0.7 |
| 330 | 19.9 | 6.3 | 24 | 3000 | 16.50 | 220 | 4.1 | 200 | 9.8 | 80 | 217 | 12 | 0.7 |
| 340 | 20.7 | 6.3 | 24 | 3000 | 16.31 | 220 | 4.4 | 200 | 10 | 80 | 231 | 10 | 0.8 |
| 350 | 19.7 | 6.7 | 24 | 3000 | 16.19 | 250 | 4.2 | 170 | 9.9 | 80 | 240 | 10 | 0.8 |
| 360 | 20.4 | 6.0 | 24 | 3000 | 16.20 | 250 | 4.4 | 170 | 9.6 | 80 | 224 | 12 | 0.7 |
| 370 | 19.8 | 6.5 | 24 | 3000 | 16.09 | 250 | 4.2 | 170 | 10.2 | 80 | 201 | 10 | 0.7 |
| 380 | 20.4 | 6.4 | 24 | 3000 | 16.10 | 250 | 4.4 | 170 | 9.8 | 80 | 203 | 10 | 0.8 |
| 390 | 20.5 | 6.2 | 24 | 3000 | 16.09 | 250 | 4.3 | 170 | 9.5 | 80 | 215 | 10 | 0.8 |
| 400 | 19.5 | 6.6 | 24 | 3000 | 16.10 | 250 | 4.2 | 170 | 9.8 | 80 | 208 | 8 | 0.8 |
| 410 | 20.7 | 6.6 | 24 | 3000 | 15.76 | 250 | 4.2 | 170 | 10 | 80 | 204 | 8 | 0.8 |
| 420 | 19.6 | 6.7 | 24 | 3000 | 16.05 | 250 | 4.3 | 170 | 10.1 | 80 | 209 | 8 | 0.8 |
| 430 | 20.3 | 6.4 | 24 | 3000 | 15.61 | 250 | 4.7 | 170 | 9.9 | 80 | | | |
| 440 | 20.2 | 6.5 | 24 | 3000 | 15.72 | 250 | 4.7 | 170 | 9.8 | 80 | 251 | 12 | 0.8 |
| 450 | 20.8 | 6.3 | 24 | 3000 | 16.10 | 250 | 5.3 | 170 | 9.8 | 80 | 223 | 11 | 0.8 |
| 460 | 18.4 | 6.5 | 24 | 3000 | 16.21 | 250 | 5.1 | 170 | 10.0 | 80 | 241 | 13 | 0.7 |
| 470 | 18.0 | 6.6 | 24 | 3000 | 16.46 | 250 | 6.3 | 170 | 9.9 | 80 | 217 | 12 | 0.7 |
| 480 | 18.5 | 6.4 | 24 | 3000 | 16.10 | 250 | 4.6 | 170 | 9.8 | 80 | 256 | 13 | 0.8 |
| 490 | 18.6 | 6.2 | 24 | 3000 | 16.09 | 250 | 4.0 | 170 | 9.5 | 80 | 232 | 13 | 0.7 |
| 500 | 18.5 | 6.5 | 24 | 3000 | 15.85 | 250 | 4.3 | 170 | 9.9 | 80 | 219 | 10 | 0.8 |
| 510 | 18.6 | 6.2 | 24 | 3000 | 15.78 | 250 | 4.3 | 170 | 9.9 | 80 | 217 | 9 | 0.6 |
| 520 | 18.6 | 6.6 | 24 | 3000 | 15.67 | 250 | 4.3 | 170 | 9.3 | 80 | 222 | 10 | 0.6 |
| 530 | 19.0 | 6.4 | 24 | 3000 | 15.26 | 250 | 4.0 | 170 | 9.9 | 80 | 215 | 10 | 0.7 |
| 540 | 18.0 | 6.5 | 24 | 3000 | 14.97 | 250 | 4.2 | 170 | 9.8 | 80 | 207 | 11 | 0.7 |
| 550 | 14.1 | 6.4 | 24 | 3000 | 15.87 | 250 | 4.4 | 170 | 9.7 | 80 | 221 | 10 | 0.6 |
| 560 | 15.8 | 6.4 | 24 | 3000 | 15.60 | 250 | 4.2 | 170 | 9.7 | 80 | 237 | 9 | 0.7 |
| 570 | 16.1 | 6.4 | 24 | 3000 | 16.80 | 250 | 6.6 | 170 | 9.6 | 80 | 228 | 9 | 0.7 |
| 580 | 16.8 | 6.4 | 24 | 3000 | 16.57 | 250 | 6.0 | 170 | 9.4 | 80 | | | |
| 590 | 15.2 | 6.6 | 24 | 3000 | 16.48 | 250 | 4.4 | 170 | 9.1 | 80 | 226 | 10 | 0.7 |
| 600 | 15.4 | 6.3 | 24 | 3000 | 16.34 | 250 | 4.3 | 170 | 9.3 | 80 | 220 | 9 | 0.7 |
| 610 | 15.2 | 6.4 | 24 | 3000 | 16.09 | 250 | 4.5 | 170 | 9.4 | 80 | 202 | 8 | 0.7 |
| 620 | 15.5 | 6.4 | 26 | 3000 | 16.08 | 250 | 4.5 | 170 | 9.4 | 80 | | | |
| 630 | 15.9 | 6.4 | 26 | 3000 | 15.88 | 250 | 4.3 | 170 | 9.5 | 80 | 204 | 8 | 0.7 |
| 640 | 16.4 | 6.3 | 26 | 3000 | 15.80 | 250 | 4.2 | 200 | 9.3 | 80 | 215 | 8 | 0.9 |
| 650 | 16.5 | 6.3 | 26 | 3000 | 15.78 | 250 | 3.6 | 200 | 9.3 | 80 | 199 | 8 | 0.9 |
| 660 | 15.0 | 6.5 | 26 | 3000 | 15.92 | 250 | 4.3 | 200 | 9.3 | 80 | 217 | 8 | 0.8 |
| 670 | 15.6 | 6.5 | 26 | 3000 | 15.92 | 250 | 4.1 | 200 | 9.4 | 80 | 207 | 9 | 1.0 |
| 680 | 15.3 | 6.5 | 26 | 3000 | 16.03 | 250 | 4.8 | 200 | 9.4 | 80 | 217 | 8 | 0.9 |
| 690 | 16.1 | 6.5 | 26 | 3000 | 16.16 | 250 | 5.4 | 200 | 9.4 | 80 | | | |
| 700 | 16.0 | 6.4 | 26 | 3000 | 16.17 | 250 | 4.7 | 200 | 9.4 | 80 | 198 | 8 | 1.0 |
| 710 | 18.0 | 6.5 | 26 | 3000 | 16.53 | 250 | 6.2 | 200 | 9.3 | 80 | 211 | 9 | 1.0 |
| 720 | 17.9 | 6.5 | 26 | 3000 | 16.25 | 250 | 4.2 | 200 | 9.2 | 80 | 212 | 9 | 1.0 |
| 730 | 17.0 | 6.5 | 26 | 3000 | 15.91 | 250 | 4.3 | 200 | 9.1 | 80 | 208 | 9 | 1.0 |
| 740 | 16.9 | 6.5 | 26 | 3000 | 15.66 | 250 | 4.1 | 200 | 9.2 | 80 | 203 | 9 | 1.0 |
| 750 | 16.7 | 6.2 | 26 | 3000 | 15.60 | 250 | 4.3 | 200 | 9.2 | 80 | 198 | 7 | 1.0 |
| 760 | 18.2 | 6.3 | 26 | 3000 | 16.36 | 250 | 5.3 | 200 | 9.4 | 80 | 211 | 9 | 1.0 |
| 770 | 17.6 | 6.5 | 26 | 3000 | 15.95 | 250 | 4.2 | 200 | 9.7 | 80 | 198 | 7 | 1.0 |
| 780 | 18.8 | 6.0 | 26 | 3000 | 15.58 | 250 | 3.9 | 200 | 9.1 | 80 | 198 | 7 | 1.0 |
| 790 | 18.5 | 6.0 | 26 | 3000 | 15.52 | 250 | 3.9 | 200 | 9.4 | 80 | 219 | 9 | 1.0 |
| 800 | 18.5 | 6.1 | 26 | 3000 | 16.25 | 250 | 4.8 | 200 | 9.3 | 80 | 232 | 10 | 1.0 |
| 810 | 18.5 | 6.1 | 26 | 3000 | 16.25 | 250 | 3.8 | 200 | 9.5 | 80 | 227 | 10 | 1.0 |
| 820 | 18.6 | 6.1 | 26 | 3000 | 15.85 | 250 | 4.3 | 200 | 8.9 | 80 | 265 | 10 | 1.0 |
| 830 | 18.4 | 6.1 | 26 | 3000 | 15.52 | 250 | 3.9 | 200 | 9.4 | 80 | 259 | 10 | 1.6 |
| 840 | 18.9 | 6.0 | 26 | 3000 | 15.56 | 250 | 3.9 | 200 | 9.4 | 80 | 252 | 11 | 1.5 |
| 850 | 18.0 | 6.2 | 26 | 3000 | 15.53 | 250 | 4.1 | 200 | 9.2 | 80 | 255 | 12 | 1.5 |
| 860 | 18.4 | 6.1 | 26 | 3000 | 15.21 | 250 | 3.7 | 200 | 8.5 | 80 | 269 | 10 | 1.5 |

TABLE 7-continued (EDI Apparatus data with 1$^{st}$ pass RO permeate water with Product flow rate of 3.0 m3/hr (3000 LPH))

| | | | | | | | | | | | | | |
|---|---|---|---|---|---|---|---|---|---|---|---|---|---|
| 870 | 18.2 | 6.1 | 26 | 3000 | 14.91 | 250 | 4.3 | 200 | 6.4 | 80 | 272 | 10 | 1.5 |
| 880 | 18.5 | 6.1 | 26 | 3000 | 15.25 | 250 | 3.9 | 200 | 9.3 | 80 | 255 | 9 | 1.6 |
| 890 | 18.5 | 6.2 | 26 | 3000 | 15.16 | 250 | 3.9 | 200 | 8.9 | 80 | 257 | 10 | 1.4 |
| 900 | 18.4 | 6.2 | 26 | 3000 | 15.01 | 250 | 3.7 | 200 | 9.5 | 80 | 262 | 11 | 1.4 |
| 910 | 18.6 | 6.2 | 26 | 3000 | 14.74 | 250 | 3.7 | 200 | 9.8 | 80 | 256 | 11 | 1.4 |
| 920 | 18.4 | 6.5 | 26 | 3000 | 14.85 | 250 | 4.3 | 200 | 7.4 | 80 | 231 | 10 | 1.5 |
| 930 | 18.4 | 6.4 | 26 | 3000 | 14.81 | 250 | 3.8 | 200 | 9.4 | 80 | 262 | 10 | 1.4 |
| 940 | 18.7 | 6.6 | 26 | 3000 | 15.40 | 250 | 9.0 | 200 | 9.6 | 80 | 279 | 10 | 1.5 |
| 950 | 18.9 | 6.5 | 26 | 3000 | 15.53 | 250 | 4.2 | 200 | 9.4 | 80 | 267 | 10 | 1.5 |
| 960 | 18.7 | 6.5 | 26 | 3000 | 15.15 | 250 | 3.9 | 200 | 9.3 | 80 | 263 | 11 | 1.4 |
| 970 | 18.6 | 5.9 | 26 | 3000 | 15.31 | 250 | 3.9 | 200 | 9.2 | 80 | 275 | 11 | 1.4 |
| 980 | 18.7 | 6.4 | 24 | 3000 | 15.38 | 250 | 3.7 | 200 | 9.7 | 80 | 259 | 10 | 1.4 |
| 990 | 18.1 | 6.5 | 24 | 3000 | 15.38 | 250 | 4.3 | 200 | 6.9 | 80 | 278 | 10 | 1.4 |
| 1000 | 18.3 | 6.3 | 24 | 3000 | 15.42 | 250 | 4.2 | 200 | 6.6 | 80 | 271 | 10 | 1.4 |
| 1010 | 18.3 | 6.3 | 24 | 3000 | 15.68 | 250 | 4.2 | 200 | 6.6 | 80 | 258 | 10 | 1.5 |

CONCLUSIONS

The stack with conventional design given in example 1 does not deliver higher flows at lower differential pressures whereas the examples given above with split flow method are able to deliver much higher flows at same differential pressure while maintaining the quality parameters required for product. The same stack design can also produce quality product when operated with water produced by single pass RO in a conventional mode as detailed in data through example 4. This proves the flexibility of the stack design for both single and double pass RO waters.

We claim:

1. An electrodeionization apparatus comprising:
  a first end plate;
  a first electrode house plate ("EHP") located adjacent to the first end plate, said EHP comprising two cathodes, cationic resin, and an anion membrane;
  a plurality of cell pairs comprising alternating concentrate chambers and dilute chambers, wherein each concentrate chamber comprises a concentrate spacer placed over an anion membrane,
    wherein each concentrate chamber comprises two independent concentrate sections separated by a concentrate rib, said concentrate sections comprising a conductive mesh, wherein each of said concentrate sections has separate concentrate inlet ports and concentrate outlet ports; and
    wherein each dilute chamber comprises a cation membrane oriented toward the first EHP, a dilute spacer, and an anion membrane, wherein each dilute chamber comprises two independent dilute sections separated by a dilute rib and fed by a common feed port that splits flow of feed water equally into the independent dilute sections, each of said dilute sections having separate product ports;
  a second end plate; and
  a second EHP located adjacent to the second end plate, said second EHP comprising two anodes, a cationic membrane, and cation resin media.

2. The electrodeionization apparatus of claim 1, further comprising a product header for collecting and combining product water from each of said product ports.

3. The electrodeionization apparatus of claim 1, comprising 30-35 cell pairs.

4. The electrodeionization apparatus of claim 1, comprising at least 30 cell pairs.

5. The electrodeionization apparatus of claim 1, further comprising a plurality of EPDM rings between the concentrate spacers and dilute spacers.

6. An combined electrodeionization apparatus comprising a plurality of electrodeionization apparatus of claim 1 connected in series.

7. The electrodeionization apparatus of claim 1, wherein the electrodeionization capacity of the apparatus is twice that of an electrodeionization apparatus having the same number of cells and same membrane area but single-section dilute spacers and single-section concentrate spacers.

* * * * *